(12) United States Patent
Bae et al.

(10) Patent No.: US 12,490,627 B2
(45) Date of Patent: Dec. 2, 2025

(54) TOUCH SENSOR, DISPLAY DEVICE INCLUDING THE SAME, AND METHOD OF MANUFACTURING THE SAME

(71) Applicant: Samsung Display Co., LTD., Yongin-si (KR)

(72) Inventors: Joon Woo Bae, Yongin-si (KR); Guang Hai Jin, Yongin-si (KR); Sam Tae Jeong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/784,816

(22) Filed: Jul. 25, 2024

(65) Prior Publication Data

US 2025/0185484 A1     Jun. 5, 2025

(30) Foreign Application Priority Data

Dec. 4, 2023    (KR) .......................... 10-2023-0173720

(51) Int. Cl.

| | |
|---|---|
| *G06F 3/041* | (2006.01) |
| *G06F 3/044* | (2006.01) |
| *H10K 59/12* | (2023.01) |
| *H10K 59/131* | (2023.01) |
| *H10K 59/40* | (2023.01) |

(52) U.S. Cl.
CPC ........... *H10K 59/40* (2023.02); *G06F 3/0446* (2019.05); *H10K 59/1201* (2023.02); *H10K 59/131* (2023.02)

(58) Field of Classification Search
None
See application file for complete search history.

(56) References Cited

U.S. PATENT DOCUMENTS 10,194,538 B2    1/2019   Lee et al.

FOREIGN PATENT DOCUMENTS

| CN | 114779972 A | * | 7/2022 |
|---|---|---|---|
| KR | 10-2147842 B1 | | 8/2020 |

OTHER PUBLICATIONS

Translation of CN-114779972-A into English; Chen et al. (Year: 2022).*

* cited by examiner

*Primary Examiner* — Brian M Butcher
(74) *Attorney, Agent, or Firm* — Womble Bond Dickinson (US) LLP

(57) ABSTRACT

A display device may include a display panel having a plurality of pixels therein, a first conductive pattern on the display panel, a touch insulating layer covering at least a portion of the first conductive pattern, a second conductive pattern on the touch insulating layer, and an organic insulating layer. The second conductive pattern may include a first metal layer and a second metal layer. The first metal layer may include a plurality of sub-metal layers, and the second metal layer may include a plurality of sub-metal layers. A first sub-metal layer of the first metal layer may be stacked on a first sub-metal layer of the second metal layer, and a width of the first sub-metal layer of the first metal layer may be wider than a width of the first sub-metal layer of the second metal layer.

20 Claims, 19 Drawing Sheets

TOUCH SENSOR, DISPLAY DEVICE INCLUDING THE SAME, AND METHOD OF MANUFACTURING THE SAME

CROSS-REFERENCE TO RELATED APPLICATION

The present application claims priority to and the benefit of Korean Patent Application No. 10-2023-0173720, filed on Dec. 4, 2023, in the Korean Intellectual Property Office, the entire disclosure of which is incorporated herein by reference.

BACKGROUND

1. Field

The present disclosure generally relates to a touch sensor, a display device including the same, and a method of manufacturing the same.

2. Description of the Related Art

Electronic devices are widely used, which have touch panels mounted therein to have a function capable of indicating positions of touches. In particular, in mobile electronic devices such as smartphones and tablet computers, touch panels capable of sensing touch inputs are widely utilized. When external light (or light incident from the outside) reaches a surface of a touch panel, light reflection may occur, and this may have an influence or impact on the security of visibility of the display panel. When the brightness of the display panel is increased to reduce influence of the external light, the power consumption of the display panel may increase. Therefore, it is desirable for a technique that is capable of securing the visibility of the display panel without increasing the power consumption of the display panel.

The above information disclosed in this Related Art section is only for enhancement of understanding of the background of the disclosure and therefore it may contain information that does not form (or provide) the prior art that is already suitable in this country to a person of ordinary skill in the art.

SUMMARY

Embodiments provide a touch sensor, a display device including the same, and a method of manufacturing the same, in which side external light reflection can be reduced.

In accordance with an aspect of one or more embodiments present disclosure, a display device may include: a display panel including a plurality of pixels; a first conductive pattern on the display panel; a touch insulating layer covering at least a portion of the first conductive pattern; and a second conductive pattern on the touch insulating layer, the second conductive pattern connected to the first conductive pattern through a contact hole in which at least a portion of the touch insulating layer is removed, wherein the second conductive pattern includes a first metal layer and a second metal layer, wherein the first metal layer includes a plurality of sub-metal layers, the plurality of sub-metal layers of the first metal layer including a first sub-metal layer, wherein the second metal layer includes a plurality of sub-metal layers, the plurality of sub-metal layers of the second metal layer including a first sub-metal layer, wherein the second conductive pattern includes a multi-layer structure in which the plurality of sub-metal layers of the first metal layer and the plurality of sub-metal layers of the second metal layer are alternately arranged, wherein the first sub-metal layer of the first metal layer is stacked on the first sub-metal layer of the second metal layer, and wherein a width of the first sub-metal layer of the first metal layer is wider than a width of the first sub-metal layer of the second metal layer.

A width of the first sub-metal layer of the first metal layer in a first direction and a width of the first sub-metal layer of the first metal layer in a second direction crossing the first direction may be wider than a width of the first sub-metal layer of the second metal layer in the first direction and a width of the first sub-metal layer of the second metal layer in the second direction, respectively.

The first metal layer may include at least one of carbon nano tube or titanium, and wherein the second metal layer includes at least one of aluminum or copper.

A reflectivity of the first metal layer may be lower than a reflectivity of the second metal layer.

A width of each of the plurality of sub-metal layers of the first metal layer that are closer to the touch insulating layer may be wider than a width of the sub-metal layer that is farther from the touch insulating layer, and wherein, a width of each of the plurality of sub-metal layers of the second metal layer that are closer to the touch insulating layer may be wider than a width of the sub-metal layer that is farther from the touch insulating layer.

The first conductive pattern may include a third metal layer and a fourth metal layer, wherein the third metal layer includes a first sub-metal layer and a second sub-metal layer, wherein the fourth metal layer is between the first sub-metal layer and the second sub-metal layer of the third metal layer, and wherein the fourth metal layer includes a trapezoidal shape in which an area of a lower side is greater than an area of an upper side, and includes an inclined sidewall connecting the lower side with the upper side.

The first conductive pattern may include a third metal layer and a fourth metal layer, wherein the third metal layer includes a plurality of sub-metal layers, the plurality of sub-metal layers of the third metal layer including a first sub-metal layer, wherein the fourth metal layer includes a plurality of sub-metal layers, the plurality of sub-metal layer of the fourth metal layer including a first sub-metal layer, wherein the first conductive pattern includes a multi-layer structure in which the plurality of sub-metal layers of the third metal layer and the plurality of sub-metal layers of the fourth metal layer are alternately arranged, wherein the first sub-metal layer of the third metal layer are stacked on the first sub-metal layer of the fourth metal layer, and wherein a width of the first sub-metal layer of the third metal layer is wider than a width of the first sub-metal layer of the fourth metal layer.

In accordance with another aspect of one or more embodiments present disclosure, a method of manufacturing a display device is described. The method may include: forming an encapsulation layer on a display panel; forming a first conductive pattern on the encapsulation layer; forming a touch insulating layer covering at least a portion of the first conductive pattern; and forming a second conductive pattern on the touch insulating layer, wherein the second conductive pattern includes a first metal layer and a second metal layer, wherein the first metal layer includes a plurality of sub-metal layers, the plurality of sub-metal layers of the first metal layer including a first sub-metal layer, wherein the second metal layer includes a plurality of sub-metal layers, the plurality of sub-metal layers of the second metal layer including a first sub-metal layer, wherein the second conductive pattern includes a multi-layer structure in which the plurality of sub-metal layers of the first metal layer and the plurality of sub-metal layers of the second metal layer are alternately arranged, wherein the first sub-metal layer of the first metal layer is stacked on the first sub-metal layer of the second metal layer, and wherein a width of the first sub-metal layer of the first metal layer is wider than a width of the first sub-metal layer of the second metal layer.

The forming of the second conductive pattern on the touch insulating layer may include: depositing a first metal material for the first metal layer; depositing a second metal material for the second metal layer; etching the first metal layer with a first etchant; and etching the second metal layer with a second etchant, wherein the first etchant is different from the second etchant.

The first etchant may include at least one of hydrofluoric acid or ammonium fluoride, and wherein the second etchant includes at least one of oxalic acid-based materials or hydrochloric acid-based materials.

A width of the first sub-metal layer of the first metal layer in a first direction and a width of the first sub-metal layer of the first metal layer in a second direction crossing the first direction may be wider than a width of the first sub-metal layer of the second metal layer in the first direction and a width of the first sub-metal layer of the second metal layer in the second direction, respectively.

The first metal layer may include at least one of carbon nano tube or titanium, and wherein the second metal layer includes at least one of aluminum or copper.

A reflectivity of the first metal layer may be lower than a reflectivity of the second metal layer.

A width of each of the plurality of sub-metal layers of the first metal layer that may be closer to the touch insulating layer is wider than a width of the sub-metal layer that is farther from the touch insulating layer, and wherein, a width of each of the plurality of sub-metal layers of the second metal layer that are closer to the touch insulating layer is wider than a width of the sub-metal layer that is farther from the touch insulating layer.

The first conductive pattern may include a third metal layer and a fourth metal layer, wherein the third metal layer includes a plurality of sub-metal layers, the plurality of sub-metal layers of the third metal layer including a first sub-metal layer, wherein the fourth metal layer includes a plurality of sub-metal layers, the plurality of sub-metal layers of the first metal layer including a first sub-metal layer, wherein the first conductive pattern includes a multi-layer structure in which the plurality of sub-metal layers of the third metal layer and the plurality of sub-metal layers of the fourth metal layer are alternately arranged, wherein the first sub-metal layer of the third metal layer are stacked on the first sub-metal layer of the fourth metal layer, and wherein a width of the first sub-metal layer of the third metal layer is wider than a width of the first sub-metal layer of the fourth metal layer.

The first conductive pattern may include a third metal layer and a fourth metal layer, wherein the third metal layer includes a first sub-metal layer and a second sub-metal layer, wherein the fourth metal layer is between the first sub-metal layer and the second sub-metal layer of the third metal layer, and wherein the fourth metal layer has a trapezoidal shape in which an area of a lower side is greater than an area of an upper side, and includes an inclined sidewall connecting the lower side with the upper side.

In accordance with an aspect of one or more embodiments present disclosure, a touch sensor may include: a sensing electrode extending in a first direction; and a driving electrode extending in a second direction crossing the first direction, wherein at least one of the sensing electrode or the driving electrode includes: a first conductive pattern; a touch insulating layer covering at least a portion of the first conductive pattern; and a second conductive pattern on the touch insulating layer, the second conductive pattern connected to the first conductive pattern in a contact hole in which at least a portion of the touch insulating layer is removed, wherein the second conductive pattern includes a first metal layer and a second metal layer, wherein the first metal layer includes a plurality of sub-metal layers, the plurality of sub-metal layers of the first metal layer including a first sub-metal layer, wherein the second metal layer includes a plurality of sub-metal layers, the plurality of sub-metal layers of the second metal layer including a first sub-metal layer, wherein the second conductive pattern includes a multi-layer structure in which the plurality of sub-metal layers of the first metal layer and the plurality of sub-metal layers of the second metal layer are alternately arranged, and wherein the first sub-metal layer of the first metal layer is stacked on the first sub-metal layer of the second metal layer, and a width of the first sub-metal layer of the first metal layer is wider than a width of the first sub-metal layer of the second metal layer.

A width of the first sub-metal layer of the first metal layer in the first direction and a width of the first sub-metal layer of the first metal layer in the second direction may be wider than a width of the first sub-metal layer of the second metal layer in the first direction and a width of the first sub-metal layer of the second metal layer in the second direction, respectively.

The first metal layer may include at least one of carbon nano tube or titanium, and wherein the second metal layer includes at least one of aluminum or copper.

The first conductive pattern may include a third metal layer and a fourth metal layer, wherein the third metal layer includes a plurality of sub-metal layers, the plurality of sub-metal layers of the third metal layer including a first sub-metal layer, wherein the fourth metal layer includes a plurality of sub-metal layers, the plurality of sub-metal layers of the fourth metal layer including a first sub-metal layer, wherein the first conductive pattern has a multi-layer structure in which the plurality of sub-metal layers of the third metal layer and the plurality of sub-metal layers of the fourth metal layer are alternately arranged, and wherein the first sub-metal layer of the third metal layer is stacked on the first sub-metal layer of the fourth metal layer, and a width of the first sub-metal layer of the third metal layer is wider than a width of the first sub-metal layer of the fourth metal layer.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawings, dimensions may be exaggerated for clarity of illustration. It will be understood that when an element is referred to as being "between" two elements, it can be the only element between the two elements, or one or more intervening elements may also be present. Like reference numerals refer to like elements throughout, and duplicative descriptions thereof may not be provided.

DETAILED DESCRIPTION

Figure 1:
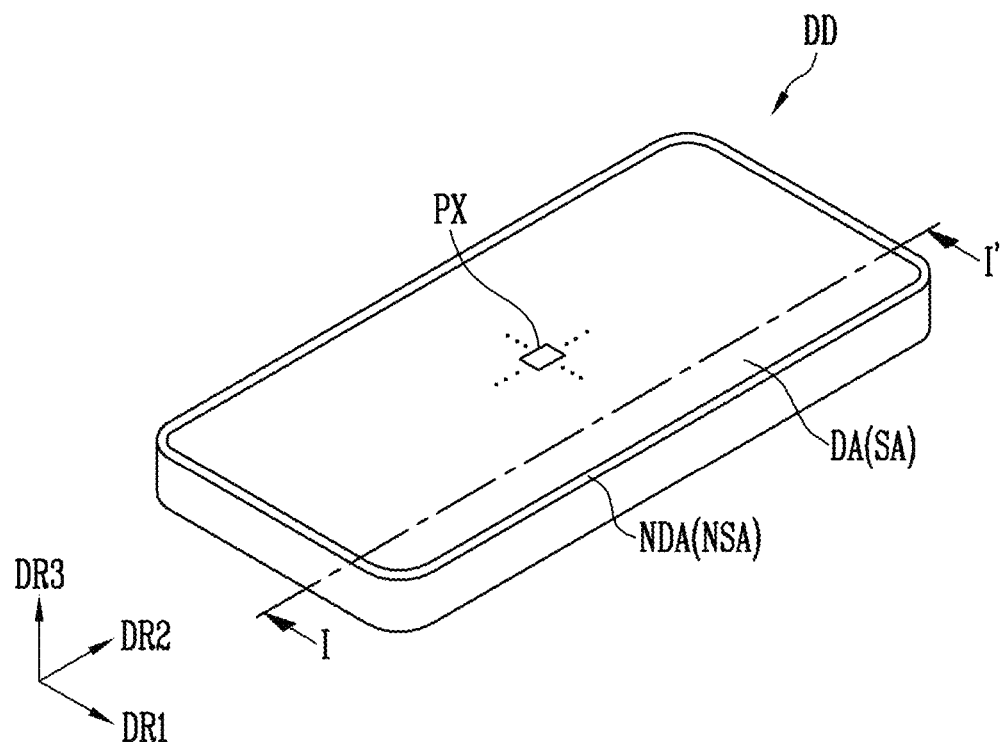
FIG. 1 is a display device, in accordance with some embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure. The present disclosure covers all modifications, equivalents, and replacements within the idea and technical scope of the present disclosure. Further, each of the features of the various embodiments of the present disclosure may be combined with each other, in part or in whole, and technically various interlocking and driving are possible. Each embodiment may be implemented independently of each other or may be implemented together in an association.

In the drawings, the relative sizes of elements, layers, and regions may be exaggerated for clarity and/or descriptive purposes. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

FIG. 1 is a perspective view of a display device in accordance with embodiments of the present disclosure.

Referring to FIG. 1, the display device DD refers to a device capable of providing visual data to a user. The display device defined in this specification refers to a device including a light emitting element capable of emitting light if (e.g., when) an electrical signal is applied thereto. For example, the display device DD in accordance with the embodiments of the present disclosure is not limited to a specific application target such as a tablet PC, a television, a smartphone, or a notebook computer.

The display device DD may include a display area DA, a non-display area NDA, a sensing area SA, and a non-sensing area NSA.

The display device DD may not only display an image through the sensing area SA, but also sense a touch input applied from the user or sense light incident at the front of the display device DD. A touch sensor of the display device DD may be located in the sensing area SA.

The touch sensor of the display device DD may not be located in the non-sensing area NSA. The non-sensing area NSA may surround the sensing area SA. However, this is merely an example, and the present disclosure is not limited thereto.

In accordance with some embodiments, a partial area (or a portion) of the display area DA may correspond to the sensing area SA. A partial area (or a portion) of the non-display area NDA may correspond to the non-sensing area NSA.

The display area DD may output visual information at the front of the display device DD. The display device DD may include at least one pixel PX. The pixels PX may be located in the display area DA.

Each of the pixels PX may include a light emitting element. The light emitting element defined in this the present disclosure may include a material severing as a light source emitting light if (e.g., when) an electrical signal is applied thereto. Each of the pixels PX may emit light in the display area DA if (e.g., when) an electrical signal corresponding to image data to be output is applied thereto.

The light emitting element may be an inorganic light emitting element including an inorganic light emitting material or a light emitting element (or a quantum dot display element) emitting light by changing a wavelength of the emitted light, utilizing a quantum dot. In some embodiments, the light emitting element may be an organic light emitting element including an organic light emitting material.

Figure 2:
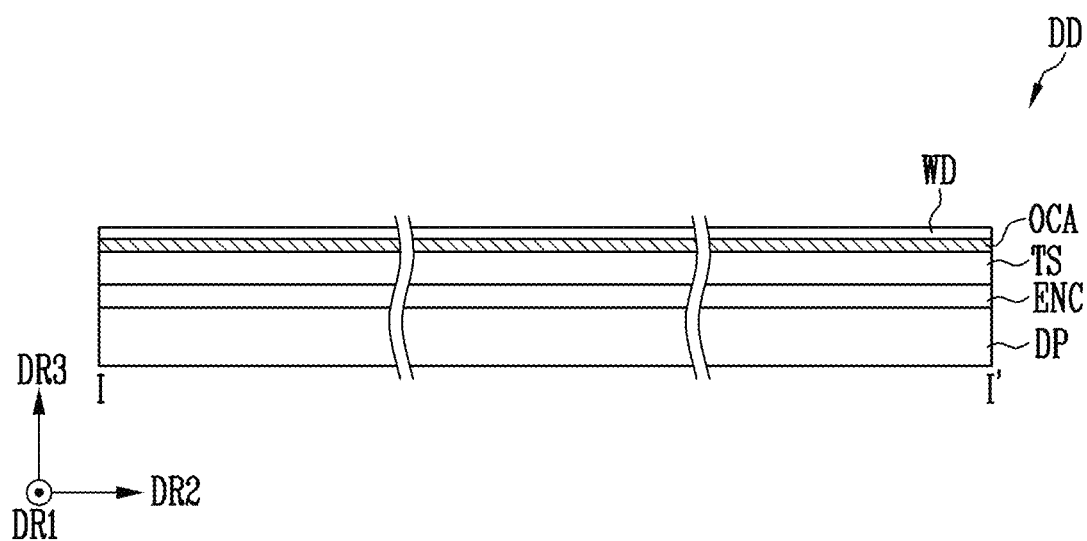
FIG. 2 is a sectional view taken along the line I-I' shown in FIG. 1 in accordance with some embodiments of the present disclosure.

FIG. 2 is a cross-sectional view taken along the line I-I' shown in FIG. 1.

Referring to FIG. 2, the display device DD may include a display panel DP, an encapsulation layer ENC, a touch sensor TS, an optically transparent adhesive member OCA, and a window WD.

The display panel DP may output visual data. At least one of self-luminescent display panels, such as an Organic Light Emitting Display panel (OLED panel) utilizing an organic light emitting diode as a light emitting element, a nano-scale LED display panel utilizing a nano-scale LED as a light emitting element, and a Quantum Dot Organic Light Emitting Display panel (QD OLED panel) utilizing a quantum dot and an organic light emitting diode may be utilized as the display panel. However, the present disclosure is not limited to the above-described examples, and the display panel DP may be at least one of a Liquid Crystal Display panel (LCD panel), an Electro-Phoretic Display panel (EPD panel), or an Electro-Wetting Display panel (EWD panel).

Hereinafter, for convenience, a case where the light emitting element included in the display device DD is an organic light emitting diode will be described.

The encapsulation layer ENC may be arranged on the display panel DP. The encapsulation layer ENC may prevent or reduce infiltration of external moisture and oxygen into the display panel DP.

The touch sensor TS may be located on the encapsulation layer ENC. The touch sensor TS may be located in the sensing area SA (see FIG. 1). The display panel DP and the touch sensor TS may be integrally manufactured. The touch sensor TS may be formed directly on at least one layer constituting the display panel DP, e.g., the encapsulation layer ENC may be located on the top of the display panel DP.

When a touch input is applied from the user, the touch sensor TS may acquire information from the touch input. The touch sensor TS may recognize a touch input, using a capacitive sensing type. In some embodiments, the touch sensor TS may sense a touch input, using a mutual capacitance type or sense a touch input, using a self-capacitance type.

The window WD may be located on the touch sensor TS. The window WD may be a transparent transmissive substrate. The window WD and the touch sensor TS may be bonded to each other through the optically transparent adhesive member OCA. The window WD may reduce external impact against the display device DD while allowing visual information to be transmitted therethrough. In an example, the window WD may be implemented utilizing rigid glass, flexible plastic, and/or the like. However, embodiments of the present disclosure are not limited thereto.

Figure 3:
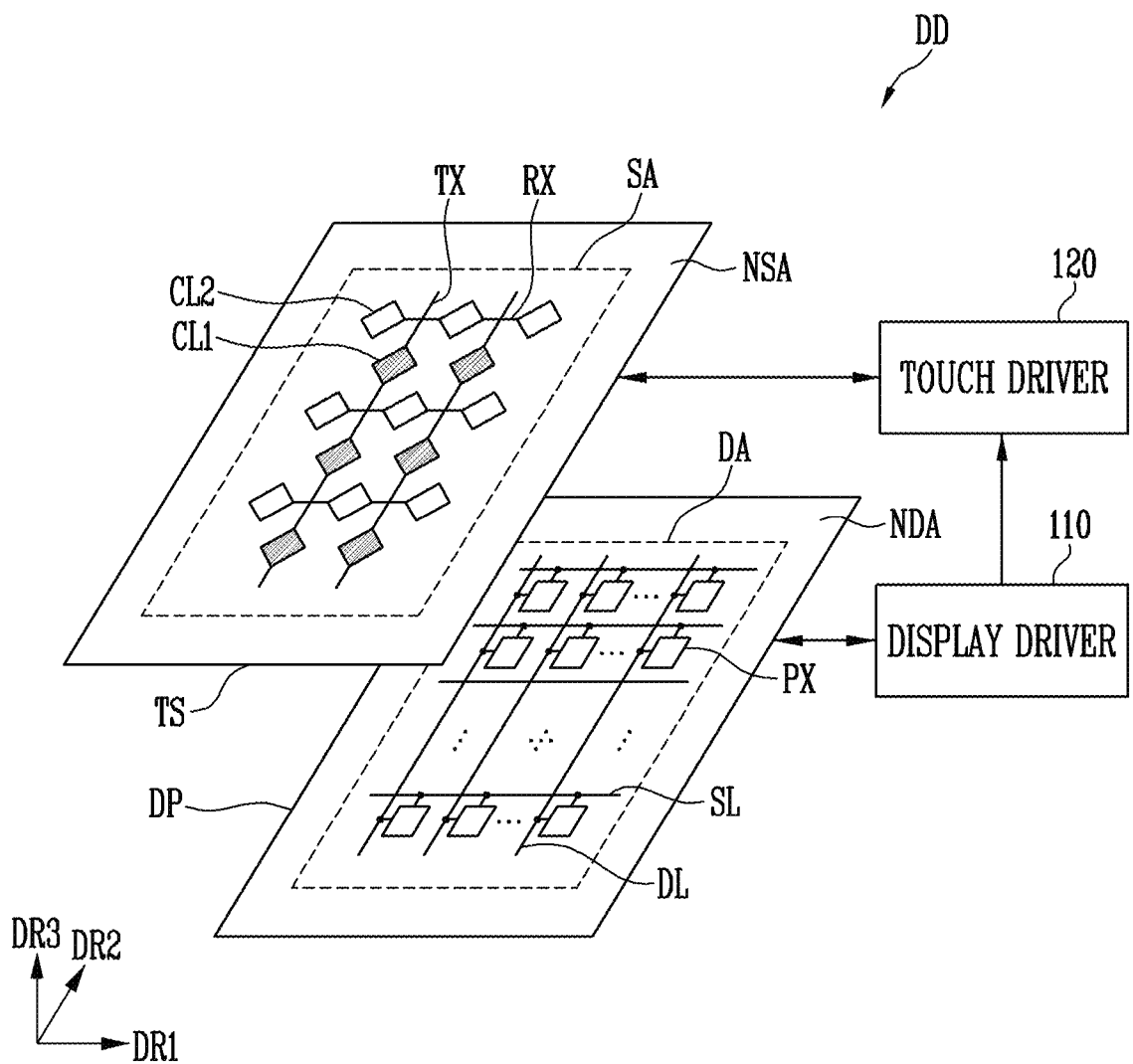
FIG. 3 is a touch sensor and a display panel of the display device, in accordance with some embodiments of the present disclosure.

FIG. 3 is a schematic of a touch sensor and a display panel of the display device in accordance with embodiments of the present disclosure.

Referring to FIG. 3, the display device DD may include a display panel DP, a touch sensor TS, a display driver 110, and a touch driver 120.

The display panel DP may include pixels PX. The pixels PX may be connected to driving lines SL and data lines DL, respectively. The pixels PX may be selected by a driving signal (e.g., a driving signal having a turn-on level voltage) supplied through the driving lights SL, and receive electrical signals corresponding to image data to be output through the data lines DL. The pixels PX may emit lights with luminances corresponding to the electrical signals, and an image may be displayed in a display area DA.

The touch sensor TS may include touch electrodes. In some embodiments, the touch electrodes may include driving electrodes TX and sensing electrodes RX. The driving electrodes TX and the sensing electrodes RX may be arranged in a sensing area SA on the touch sensor TS.

The display driver 110 may be electrically connected to the display panel DP, to drive the pixels PX. For example, the display driver 110 may include a data driver connected to the data lines DL, a scan driver connected to the driving lines SL, a timing controller configured to control the data driver and the scan driver, and/or the like.

The touch driver 120 may be connected to the touch sensor TS, to drive the touch sensor TS, utilizing the driving signal.

Figure 4:
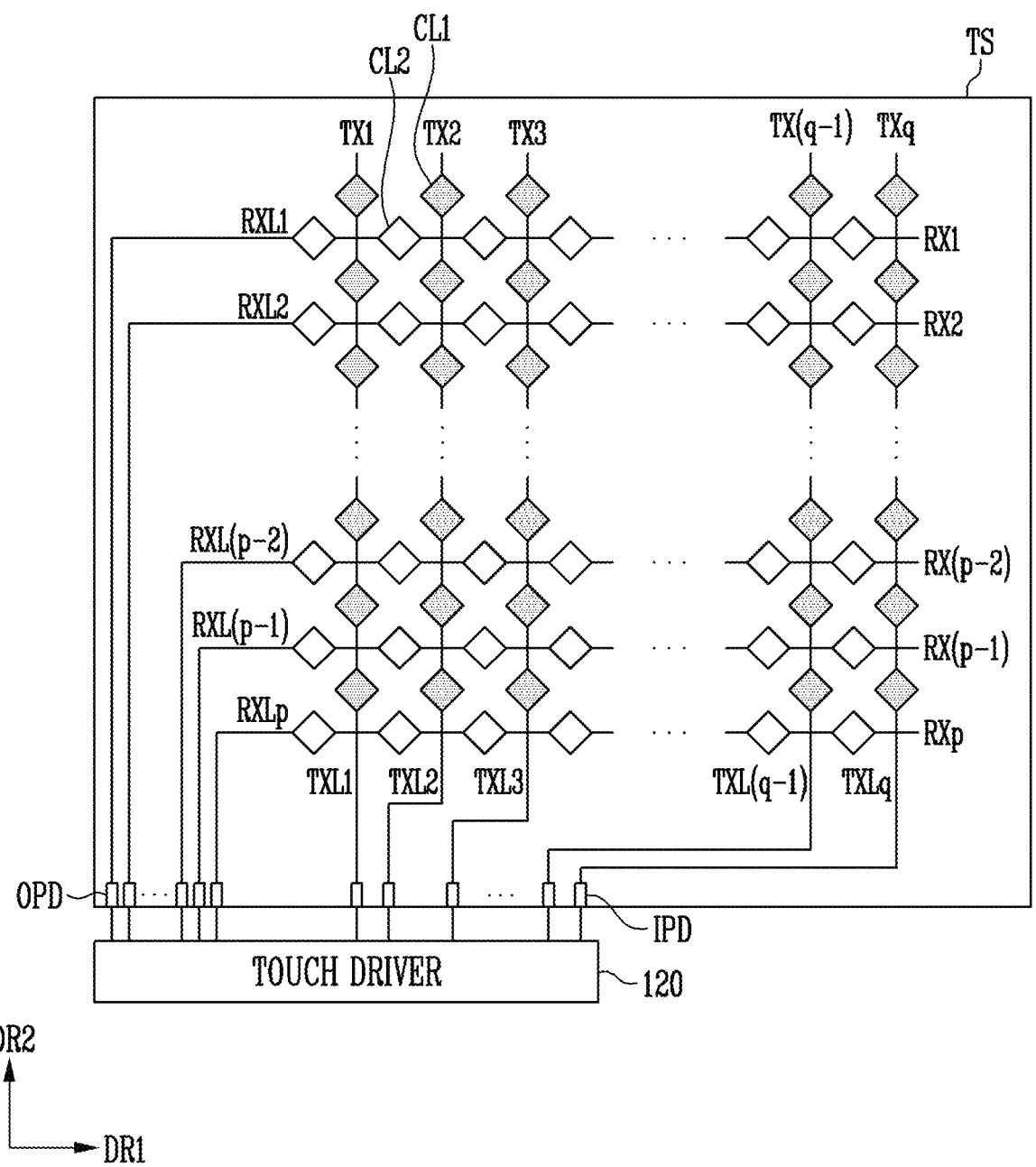
FIG. 4 is the touch sensor shown in FIG. 3, in accordance with some embodiments of the present disclosure.

FIG. 4 is a schematic of one or more embodiments of the touch sensor shown in FIG. 3.

Referring to FIG. 4, the touch sensor TS may include first to qth (where q is an integer of 1 or more) driving electrodes TX1 to TXq and first to pth (where p is an integer of 1 or more) sensing electrodes RX1 to RXp. The touch sensor TS may include first to qth driving lines TXL1 to TXLq respectively connected to the first to qth driving electrodes TX1 to TXq. The touch sensor TS may include first to pth sensing lines RXL1 to RXLp, respectively connected to the first to pth sensing electrodes RX1 to RXp.

The first to qth driving electrodes TX1 to TXq may be arranged side by side in a first direction DR1, and each of the first to qth driving electrodes TX1 to TXq may extend in a second direction DR2. The first to pth sensing electrodes RX1 to RXp may be arranged side by side in the second direction DR2, and each of the first to pth sensing electrodes RX1 to RXp may extend in the first direction DR1. Each of the first to qth driving electrodes TX1 to TXq may include first cells CL1. Each of the first to pth sensing electrodes RX1 to RXp may include second cells CL2. In FIG. 4, it is illustrated that each of the first cells CL1 and the second cells CL2 has a diamond shape. However, embodiments of the present disclosure are not limited thereto. For example, each of the first cells CL1 and the second cells CL2 may have at least one of various shapes such as a circular shape, a quadrangular shape, a triangular shape, or a mesh shape. Also, each of the first cells CL1 and the second cells CL2 may be formed as a single layer or a multi-layer. In one or more embodiments, the shapes and arrangements of the first to qth driving electrodes TX1 to TXq and the first to pth sensing electrodes RX1 to RXp may be modified in various manners.

In some embodiments, the first cells CL1 and the second cells CL2 may include at least one of various conductive materials such as a metal material or a transparent conductive material, thereby being conductive. For example, each of the first cells CL1 and the second cells CL2 may include one or more metal materials such as gold (Au), silver (Ag), aluminum (Al), molybdenum (Mo), chromium (Cr), titanium (Ti), nickel (Ni), neodymium (Nd), copper (Cu), and platinum (Pt), or alloys thereof.

The touch sensor TS may further include input pads IPD connected to the first to qth driving lines TXL1 to TXLq. The touch driver 120 may be connected to the first to qth driving lines TXL1 to TXLq through the input pads IPD.

The touch sensor TS may further include output pads OPD connected to the first to pth sensing lines RXL1 to RXLp. The touch driver 120 may be connected to the first to pth sensing lines RXL1 to RXLp through the output pads OPD.

The touch sensor TS may include first touch electrodes and second touch electrodes forming mutual capacitances together with the first touch electrodes. The first touch electrodes may be provided as (or formed by) the first to qth driving electrodes TX1 to TXq. The second touch electrodes may be provided as (or formed by) the first to pth sensing electrodes RX1 to RXp. The first to qth driving electrodes TX1 to TXq and the first to pth sensing electrodes RX1 to RXp may be electrically separated from each other while intersecting each other to form mutual capacitances.

When a touch from the user is provided to the touch sensor TS, one or more of the mutual capacitances may be changed. For example, the touch may include at least one of various types of inputs, such as a physical contact or hovering, which cause a change in the mutual capacitance. The touch driver 120 may sense the change in mutual capacitance, thereby recognizing the touch.

Figure 5:
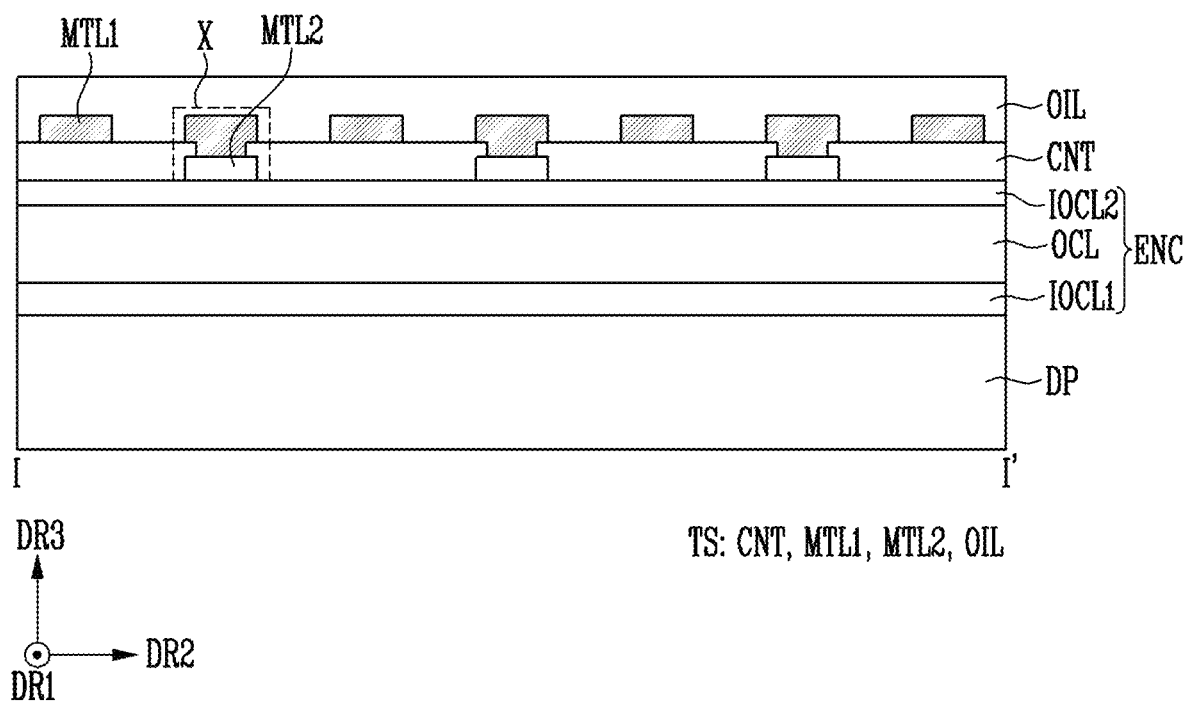
FIG. 5 is a more detailed view of a configuration of an encapsulation layer and the touch sensor, which are shown in FIG. 2, in accordance with some embodiments of the present disclosure.

FIG. 5 is a cross-sectional view illustrating in more detail a configuration of the encapsulation layer and the touch sensor, which are shown in FIG. 2, according to some embodiments.

Referring to FIGS. 1 and 5, the display device DD may include a display panel DP, an encapsulation layer ENC, and a touch sensor TS.

The encapsulation layer ENC may include a first inorganic encapsulation layer IOCL1, an organic encapsulation layer OCL, and a second inorganic encapsulation layer IOCL2. The touch sensor TS may include first conductive patterns MTL1, second conductive patterns MTL2, and a touch insulating layer CNT.

The display panel DP may include a substrate, a circuit element layer in which circuit elements are formed, a light emitting element layer, and/or the like. For example, the substrate of the display panel DP may include a glass substrate, a metal substrate, an organic/inorganic composite material substrate, and/or the like. For example, the light emitting element layer may include a light emitting element.

The encapsulation layer ENC may be arranged on the display panel DP. The encapsulation layer ENC may be configured to prevent or reduce external moisture and oxygen from infiltrating into the display panel DP. The encapsulation layer ENC may include the first inorganic encapsulation layer IOCL1, the organic encapsulation layer OCL, the second inorganic encapsulation layer IOCL2, and/or the like. The first inorganic encapsulation layer IOCL1 and the second inorganic encapsulation layer IOCL2 may include an inorganic material. For example, the inorganic material may include silicon nitride, silicon oxide, silicon oxynitride, and/or the like. The organic encapsulation layer OCL may include an organic material. For example, the organic material may include acrylic resin, epoxy resin, phenolic resin, polyamide resin, polyimide resin, unsaturated polyester resin, polyphenylene resin, polyphenylenesulfide resin, benzocyclobutene (BCB), and/or the like.

The touch sensor TS may be arranged on the encapsulation layer ENC. The touch sensor TS may include the first conductive patterns MTL1, the second conductive patterns MTL2, the touch insulating layer CNT, and an organic insulating layer OIL.

Each of the first conductive patterns MTL1 and the second conductive patterns MTL2 may include a metal or a transparent conductive layer. For example, the metal may include aluminum (Al), titanium (Ti), copper (Cu), molybdenum (Mo), silver (Ag), or any alloy thereof. For example, the transparent conductive layer may include a transparent conductive oxide such as indium tin oxide (ITO), indium zinc oxide (IZO), zinc oxide (ZnO), or indium tin zinc oxide (ITZO), a conductive polymer such as poly-polystyrene sulfonate (PEDOT:PSS), a metal nano wire, graphene, and/or the like.

The second conductive patterns MTL2 may electrically connect some of the first conductive patterns MTL1 to each other. In some embodiments, the first cells CL1 may be configured with the first conductive pattern MTL1 and the second conductive pattern MTL2, and the second cells CL2 may be configured with the first conductive pattern MTL1. In another embodiments, the first cells CL1 may be configured with the first conductive pattern MTL1, and the second cells CL2 may be configured with the first conductive pattern MTL1 and the second conductive pattern MTL2. The shapes of the first and second conductive patterns MTL1 and MTL2 will be described later with reference to FIGS. 6 to 9.

The touch insulating layer CNT may include an organic insulating layer including an organic material or an inorganic insulating layer including an inorganic material. For example, the organic material may include acrylic resin, epoxy resin, phenolic resin, polyamide resin, polyimide resin, unsaturated polyester resin, polyphenylene resin, polyphenylenesulfide resin, benzocyclobutene (BCB), and/or the like. For example, the inorganic material may include silicon nitride, silicon oxide, silicon oxynitride, and/or the like.

Some of the first conductive patterns MTL1 may be electrically connected to the second conductive patterns MTL2 by a contact hole penetrating the touch insulating layer CNT.

The organic insulating layer OIL may be arranged on the touch insulating layer CNT. The organic insulating layer OIL may be formed of an organic material. The organic insulating layer OIL may prevent or reduce infiltration of external moisture and oxygen into the first conductive pattern MTL1, the second conductive pattern MTL2, and the touch insulating layer CNT.

Figure 6:
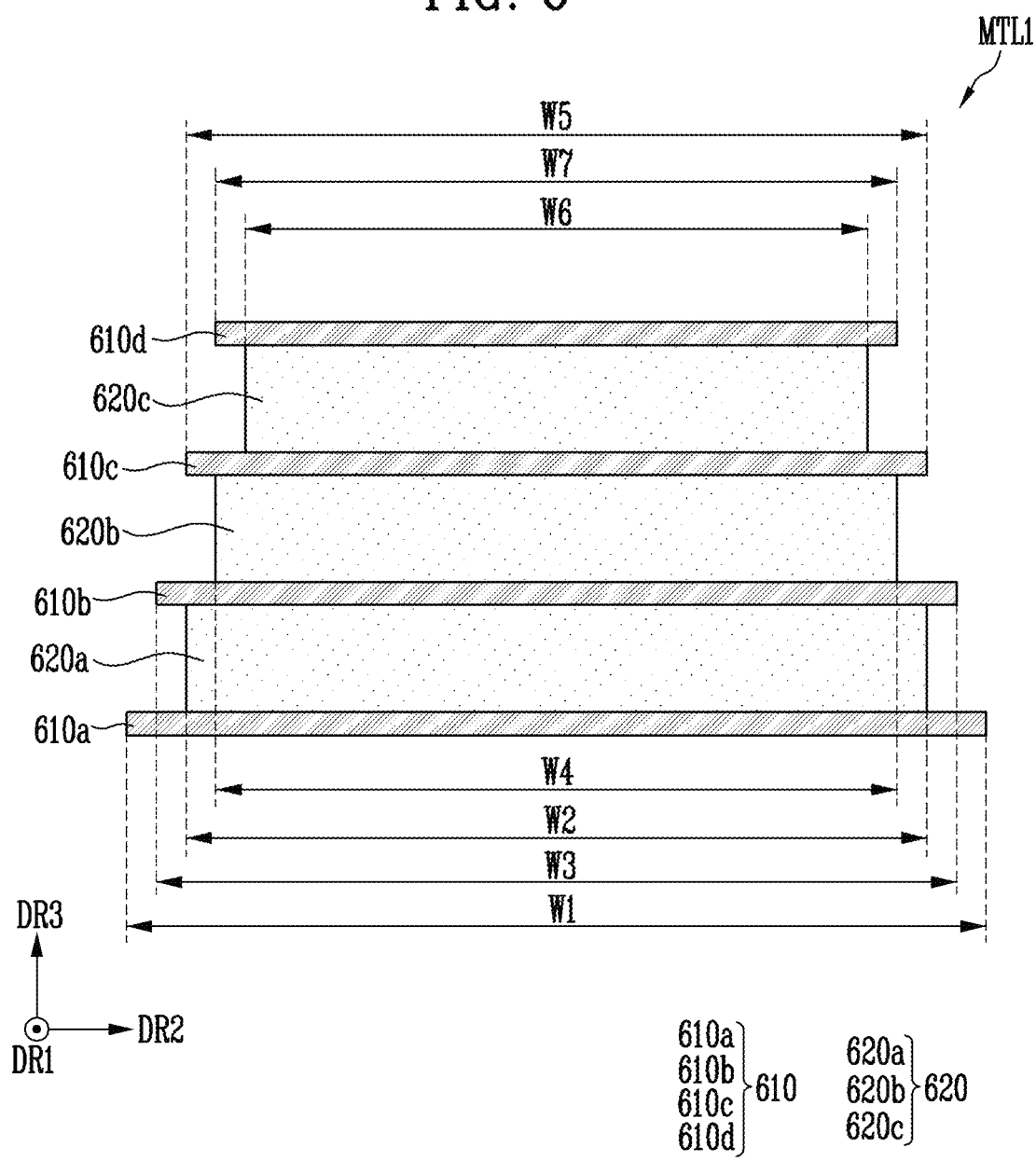
FIG. 6 is an example of a first conductive pattern shown in FIG. 5, in accordance with some embodiments of the present disclosure.

FIG. 6 is a cross-sectional view illustrating the first conductive pattern shown in FIG. 5, according to some embodiments.

Referring to FIGS. 5 and 6, the first conductive pattern MTL1 may include a first metal layer 610 and a second metal layer 620.

The first metal layer 610 may include sub-metal layers. For example, the first metal layer 610 may include an eleventh sub-metal layer 610a, a twelfth sub-metal layer 610b, a thirteenth sub-metal layer 610c, and a fourteenth sub-metal layer 610d.

The second metal layer 620 may include sub-metal layers. For example, the second metal layer 620 may include a twenty-first sub-metal layer 620a, a twenty-second sub-metal layer 620b, and a twenty-third sub-metal layer 620c.

The first metal layer 610 may perform a function of restricting or reducing a top surface and/or a bottom surface of the second metal layer 620 from being exposed to the outside. A phenomenon in which the top surface and/or the bottom surface of the second metal layer 620 are/is oxidized or corroded may be reduced by the first metal layer 610. Accordingly, in accordance with the embodiments of the present disclosure, deterioration of the reliability of touch sensing can be reduced or prevented.

The sub-metal layers of the first metal layer 610 and the sub-metal layers of the second metal layer 620 may be alternately stacked. For example, the twenty-first sub-metal layer 620a may be stacked on the eleventh sub-metal layer 610a. The twelfth sub-metal layer 610b may be stacked on the twenty-first sub-metal layer 620a. The twenty-second sub-metal layer 620b may be stacked on the twelfth sub-metal layer 610b. The thirteenth sub-metal layer 610c may be stacked on the twenty-second sub-metal layer 620b. The twenty-third sub-metal layer 620c may be stacked on the thirteenth sub-metal layer 610c. The fourteenth sub-metal layer 610d may be stacked on the twenty-third sub-metal layer 620c.

Each of the eleventh to fourteenth sub-metal layers 610a, 610b, 610c, and 610d may have a three-dimensional shape extending in the first direction DR1, the second direction DR2, and a third direction DR3. The eleventh sub-metal layer 610a may have a first width W1 in the second direction DR2. The twelfth sub-metal layer 610b may have a third width W3 in the second direction DR2. The thirteenth sub-metal layer 610c may have a fifth width W5 in the second direction DR2. The fourteenth sub-metal layer 610d may have a seventh width W7 in the second direction DR2. The widths of the first width W1, the third width W3, the fifth width W5, and the seventh width W7 may be sequentially decreasing.

Each of the twenty-first to twenty-third sub-metal layers 620a, 620b, and 620c may have a three-dimensional shape extending in the first direction DR1, the second direction DR2, and a third direction DR3. The twenty-first sub-metal layer 620a may have a second width W2 in the second direction DR2. The twenty-second sub-metal layer 620b may have a fourth width W4 in the second direction DR2. The twenty-third sub-metal layer 620c may have a sixth width W6 in the second direction DR2. The widths of the second width W2, the fourth width W4, and the sixth width W6 may be sequentially decreasing.

Widths of a sub-metal layer of the first metal layer 610 in the first direction DR1 and the second direction DR2 may be greater than widths of a sub-metal layer of the second metal layer 620, which is adjacent to the bottom of the sub-metal layer of the first metal layer 610, in first direction DR1 and the second direction DR2, respectively. For example, widths of the twelfth sub-metal layer 610b in the first direction DR1 and the second direction DR2 may be greater than widths of the twenty-first sub-metal layer 620a in the first direction DR1 and the second direction DR2, respectively. For example, widths of the thirteenth sub-metal layer 610c in the first direction DR1 and the second direction DR2 may be greater than widths of the twenty-second sub-metal layer 620b in the first direction DR1 and the second direction DR2, respectively. For example, widths of the fourteenth sub-metal layer 610d in the first direction DR1 and the second direction DR2 may be greater than widths of the twenty-third sub-metal layer 620c in the first direction DR1 and the second direction DR2, respectively. In some embodiments, the multi-layer structure of the first conductive pattern MTL1 may have a trapezoidal shape.

The second metal layer 620 may include materials having a high electrical conductivity. For example, the second metal layer 620 may include at least one of copper (Cu) and aluminum (Al).

The first metal layer 610 may include materials having a relatively lower reflectivity as compared with the materials constituting the second metal layer 620. For example, the first metal layer 610 may include at least one of Carbon Nano Tube (CNT) or titanium (Ti).

The first metal layer 610 may have a black-based color. For example, each of the eleventh to fourteenth sub-metal layers 610a, 610b, 610c, and 610d may have a black-based color.

The first metal layer 610 prevents or reduces external light incident in or along the third direction DR3 from being totally reflected by the second metal layer 620, thereby improving visibility. The aspect that the first metal layer 610 improves the visibility of the display device DD will be described in more detail later with reference to FIGS. 10 and 11.

Figure 7:
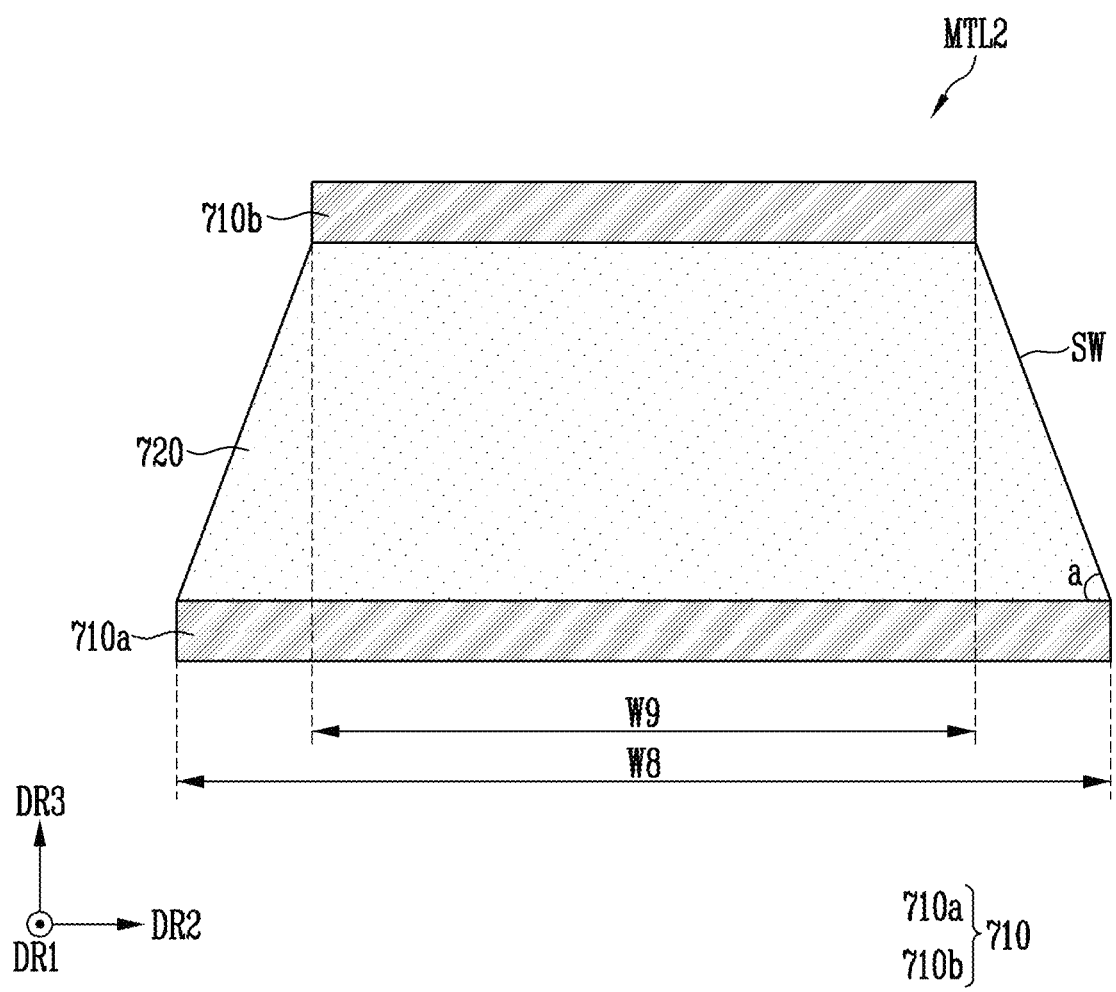
FIG. 7 is an example of a second conductive pattern shown in FIG. 5, in accordance with some embodiments of the present disclosure.

FIG. 7 is a cross-sectional view of the second conductive pattern shown in FIG. 5, in accordance with some embodiments.

Referring to FIGS. 5 and 7, the second conductive pattern MTL2 may include a first metal layer 710 and a second metal layer 720.

The first metal layer 710 may include sub-metal layers. For example, the first metal layer 710 may include an eleventh sub-metal layer 710a and a twelfth sub-metal layer 710b.

The first metal layer 710 may restrict or reduce a top surface and/or a bottom surface of the second metal layer 720 from being exposed to the outside. A phenomenon in which the top surface and/or the bottom surface of the second metal layer 720 are/is oxidized or corroded may be reduced by the first metal layer 710. Thus, in accordance with the embodiments of the present disclosure, deterioration of the reliability of touch sensing can be reduced or prevented.

In the second conductive pattern MTL2, the sub-metal layers of the first metal layer 710 and the second metal layer 720 may be alternately stacked. For example, the second metal layer 720 may be stacked on the eleventh sub-metal layer 710a. The twelfth sub-metal layer 710b may be stacked on the second metal layer 720.

Each of the first and second metal layers 710 and 720 may have a three-dimensional shape extending in the first direction DR1, the second direction DR3, and the third direction DR3. The eleventh sub-metal layer 710a may have an eighth width W8 in the second direction DR2. The twelfth sub-metal layer 710b may have a ninth width W9 in the second direction DR2. The eighth width W8 may be greater than the ninth width W9.

The second metal layer 720 may have a three-dimensional shape extending in the first direction DR1, the second direction DR2, and the third direction DR3. The second metal layer 720 may have a trapezoidal shape in which an area of a lower side is greater than an area of an upper side. The second metal layer 720 may include an inclined sidewall SW. For example, an angle a formed by the inside of the sidewall SW of the second metal layer 720 and the eleventh sub-metal layer 710a may be smaller than 90 degrees.

In this specification, a width of the second metal layer 720 may be defined by an average value of a width of the top surface of the second metal layer 720 and a width of the bottom surface of the second metal layer 720. For example, according to the shape shown in FIG. 7, the width of the second metal layer 720 may be an average value of the eighth width W8 and the ninth width W9. The widths of the twelfth sub-metal layer 710b (which is defined as the average value of the eight width W8 and the ninth width W9) in the first direction DR1 and the second direction DR2 may be greater than widths of the second metal layer 720 adjacent to the bottom of the twelfth sub-metal layer 710b in the first direction DR1 and the second direction DR2, respectively.

The second metal layer 720 may include materials having a high electrical conductivity. For example, the second metal layer 720 may include at least one of copper (Cu) or aluminum (Al).

The first metal layer 710 may include materials having a relatively lower reflectivity as compared with the materials constituting the second metal layer 720. For example, the first metal layer 710 may include at least one of Carbon Nano Tube (CNT) or titanium (Ti).

The first metal layer 710 may have a black-based color. For example, each of the eleventh and twelfth sub-metal layers 710a and 710b may have a black-based color.

Figure 8:
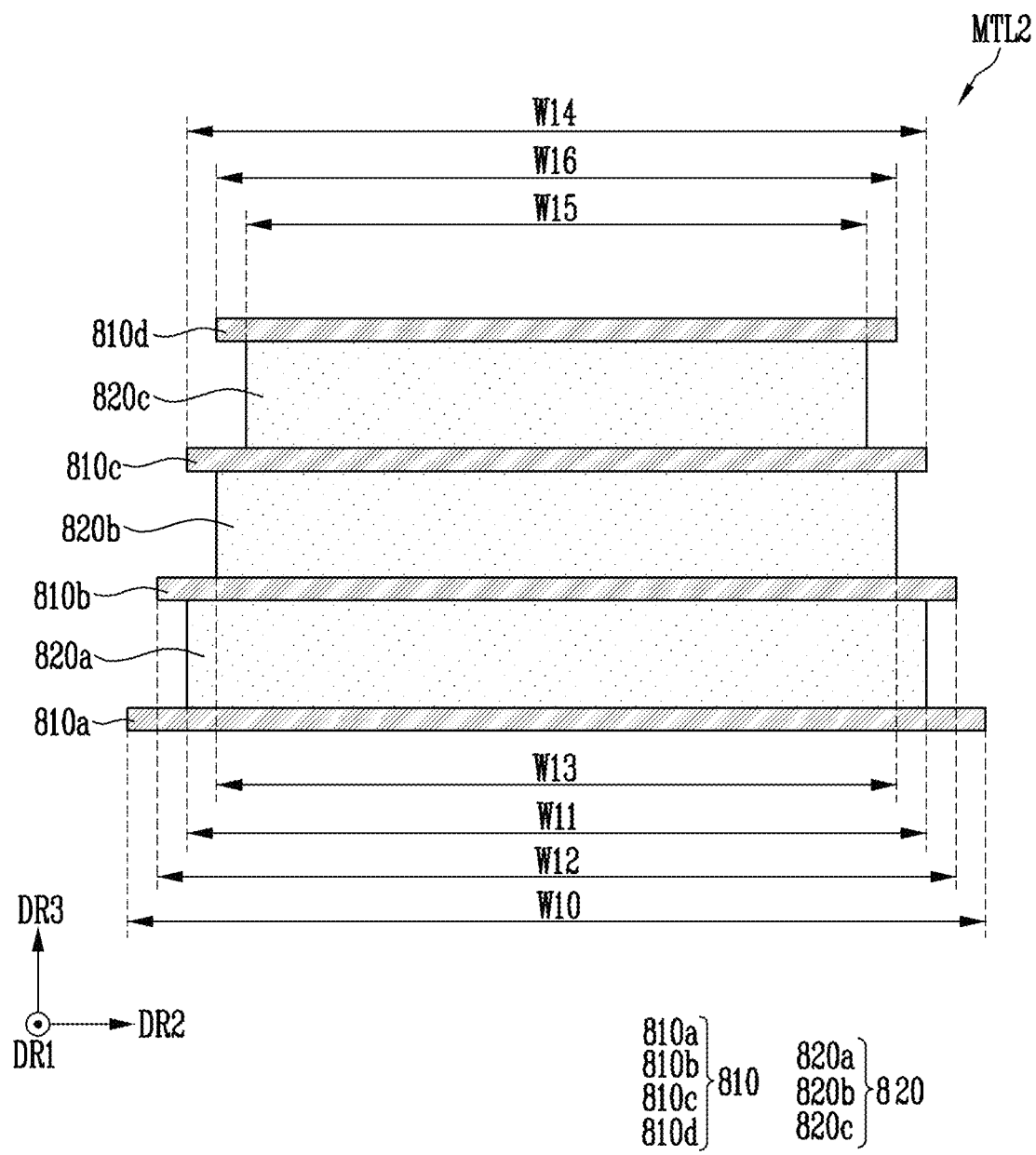
FIG. 8 is another example of the second conductive pattern shown in FIG. 5, in accordance with some embodiments of the present disclosure.

FIG. 8 is a cross-sectional view of the second conductive pattern shown in FIG. 5, in accordance with some embodiments.

Referring to FIGS. 5 and 8, the second conductive pattern MTL2 may include a first metal layer 810 and a second metal layer 820.

The first metal layer 810 may include sub-metal layers. For example, the first metal layer 810 may include an eleventh sub-metal layer 810a, a twelfth sub-metal layer 810b, a thirteenth sub-metal layer 810c, and a fourteenth sub-metal layer 810d.

The second metal layer 820 may include sub-metal layers. For example, the second metal layer 820 may include a twenty-first sub-metal layer 820a, a twenty-second sub-metal layer 820b, and a twenty-third sub-metal layer 820c.

The first metal layer 810 may perform a function of restricting or reducing a top surface and/or a bottom surface of the second metal layer 820 from being exposed to the outside. A phenomenon in which the top surface and/or the bottom surface of the second metal layer 820 are/is oxidized or corroded may be reduced by the first metal layer 810. Thus, in accordance with the embodiments of the present disclosure, deterioration of the reliability of touch sensing can be reduced or prevented.

The sub-metal layers of the first metal layer 810 and the sub-metal layers of the second metal layer 820 may be alternately stacked. For example, the twenty-first sub-metal layer 820a may be stacked on the eleventh sub-metal layer 810a. The twelfth sub-metal layer 810b may be stacked on the twenty-first sub-metal layer 820a. The twenty-second sub-metal layer 820b may be stacked on the twelfth sub-metal layer 810b. The thirteenth sub-metal layer 810c may be stacked on the twenty-second sub-metal layer 820b. The twenty-third sub-metal layer 820c may be stacked on the thirteenth sub-metal layer 810c. The fourteenth sub-metal layer 810d may be stacked on the twenty-third sub-metal layer 820c.

Each of the eleventh to fourteenth sub-metal layers 810a, 810b, 810c, and 810d may have a three-dimensional shape extending in the first direction DR1, the second direction DR2, and a third direction DR3. The eleventh sub-metal layer 810a may have a tenth width W10 in the second direction DR2. The twelfth sub-metal layer 810b may have a twelfth width W12 in the second direction DR2. The thirteenth sub-metal layer 810c may have a fourteenth width W14 in the second direction DR2. The fourteenth sub-metal layer 810d may have a sixteenth width W16 in the second direction DR2. The tenth width W10, the twelfth width W12, the fourteenth width W14, and the sixteenth width W16 may be sequentially decreasing.

Each of the twenty-first to twenty-third sub-metal layers 820a, 820b, and 820c may have a three-dimensional shape extending in the first direction DR1, the second direction DR2, and a third direction DR3. The twenty-first sub-metal layer 820a may have an eleventh width W11 in the second direction DR2. The twenty-second sub-metal layer 820b may have a thirteenth width W13 in the second direction DR2. The twenty-third sub-metal layer 820c may have a fifteenth width W15 in the second direction DR2. The eleventh width W11, the thirteenth width W13, and the fifteenth width W15 may be sequentially decreasing.

Widths of a sub-metal layer of the first metal layer 810 in the first direction DR1 and the second direction DR2 may be greater than widths of a sub-metal layer of the second metal layer 820, which are adjacent to the bottom of the sub-metal layer of the first metal layer 810, in first direction DR1 and the second direction DR2, respectively. For example, widths of the twelfth sub-metal layer 810b in the first direction DR1 and the second direction DR2 may be greater than widths of the twenty-first sub-metal layer 820a in the first direction DR1 and the second direction DR2 respectively. For example, widths of the thirteenth sub-metal layer 810c in the first direction DR1 and the second direction DR2 may be greater than widths of the twenty-second sub-metal layer 820b in the first direction DR1 and the second direction DR2, respectively. For example, widths of the fourteenth sub-metal layer 810d in the first direction DR1 and the second direction DR2 may be greater than widths of the twenty-third sub-metal layer 820c in the first direction DR1 and the second direction DR2, respectively. In some embodiments, the multi-layer structure of the second conductive pattern MTL2 may have a trapezoidal shape.

The second metal layer 820 may include materials having a relatively high electrical conductivity. For example, the second metal layer 820 may include at least one of copper (Cu) or aluminum (Al).

The first metal layer 810 may include materials having a relatively lower reflectivity as compared with the materials constituting the second metal layer 820. For example, the first metal layer 810 may include at least one of Carbon Nano Tube (CNT) or titanium (Ti).

The first metal layer 810 may have a black-based color. For example, each of the eleventh to fourteenth sub-metal layers 810a, 810b, 810c, and 810d may have a black-based color.

When the second conductive patterns MTL2 have the shape shown in FIG. 8, the reflected amount of external light may be further reduced as compared with a case where the second conductive patterns MTL2 have the shape shown in FIG. 7, and therefore visibility can be further improved.

Figure 9:
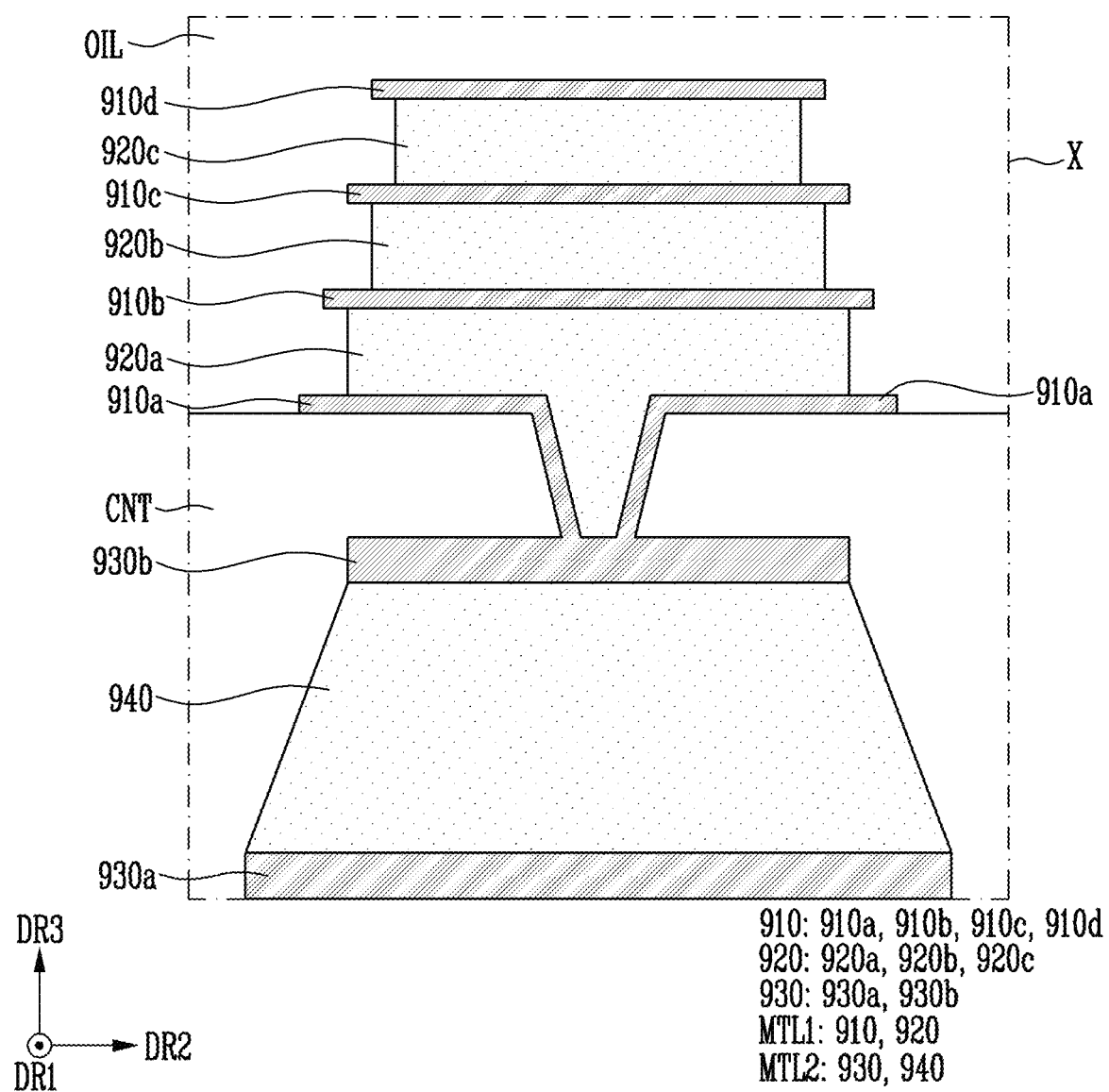
FIG. 9 is a partially enlarged view of area X shown in FIG. 5, in accordance with some embodiments of the present disclosure.

FIG. 9 is an enlarged cross-sectional view of area X shown in FIG. 5, in accordance with some embodiments. Descriptions of the touch insulating layer CNT, the first conductive pattern MTL1, and the second conductive pattern MTL2, that overlap with those already described above with reference to FIGS. 5 and 6 will not be repeated here. Hereinafter, a case where the second conductive pattern MTL2 has the shape shown in FIG. 7 is described in FIG. 9.

The first conductive pattern MTL1 may include a first metal layer 910 and a second metal layer 920. The first metal layer 910 may include eleventh to fourteenth sub-metal layers 910a, 910b, 910c, and 910d. The second metal layer 920 may include twenty-first to twenty-third sub-metal layers 920a, 920b, and 920c.

The second conductive pattern MTL2 may include a third metal layer 930 and a fourth metal layer 940. The third metal layer 930 may include thirty-first and thirty-second metal layers 930a and 930b.

A portion of the eleventh sub-metal layer 910a may be spaced apart from the other portion of the eleventh sub-metal layer 910a with the twenty-first sub-metal layer 920a. The eleventh sub-metal layer 910a may be connected to the thirty-second sub-metal layer 930b.

Figure 10:
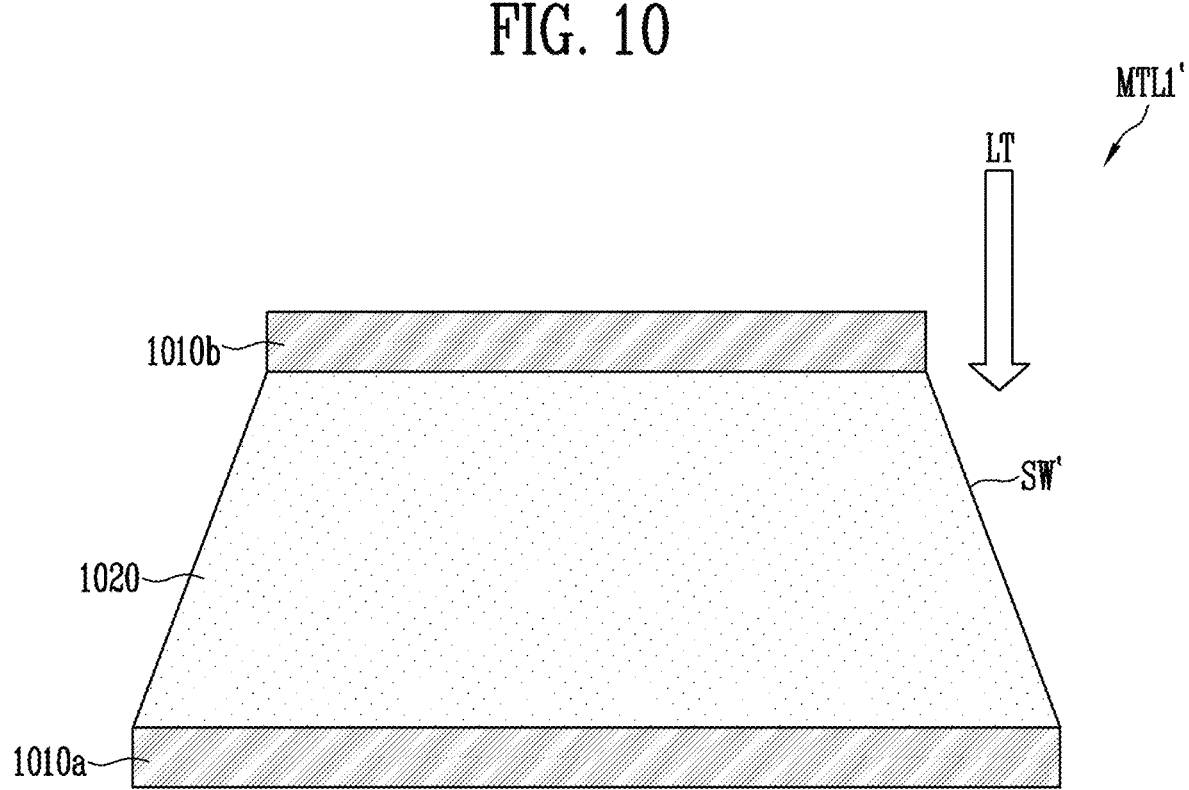
FIGS. 10 and 11 are views illustrating improved visibility in the touch sensor of the display device, in accordance with some embodiments of the present disclosure.
Figure 11:
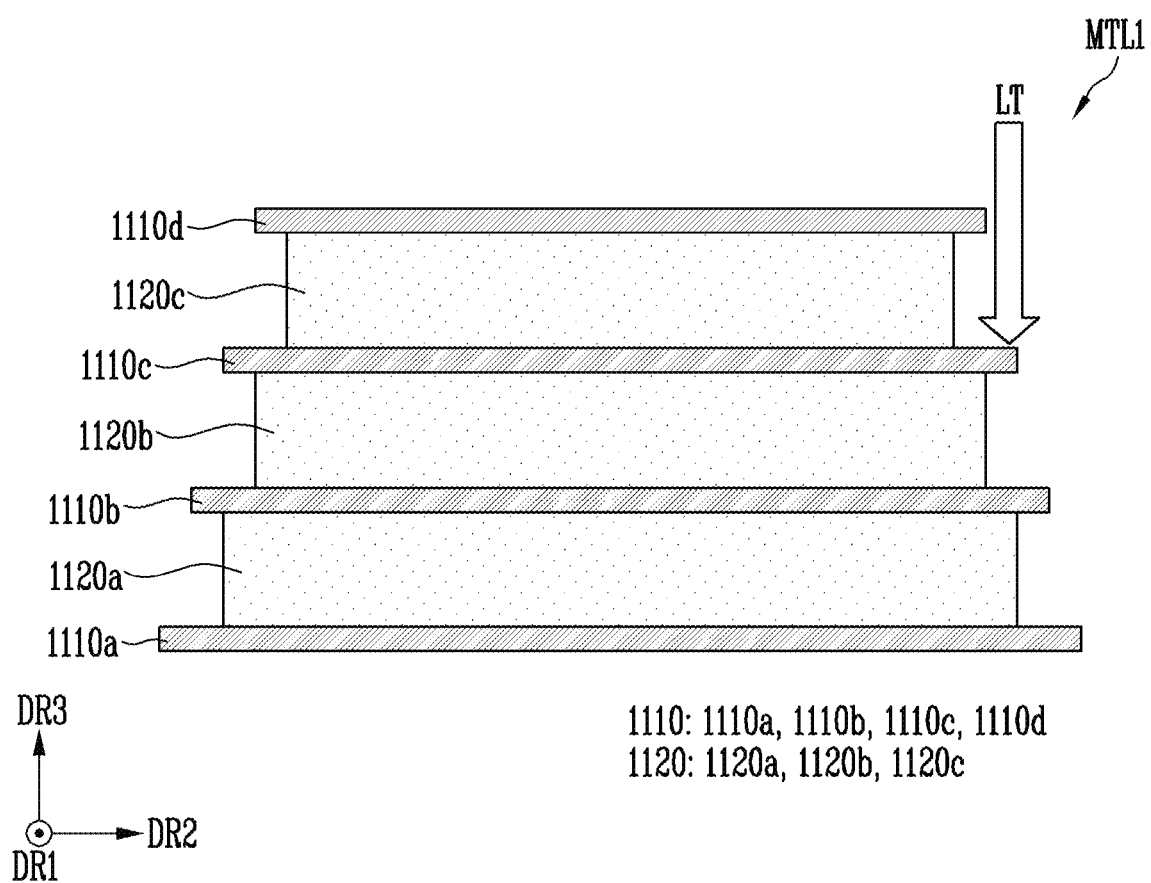

FIGS. 10 and 11 are cross-sectional views illustrating the improved visibility in the touch sensor of the display device, in accordance with some embodiments. FIG. 10 is a view illustrating a phenomenon when external light is incident into a first conductive pattern MTL1' where the first conductive pattern MTL1' includes an inclined surface SW'. FIG. 11 is a view illustrating the phenomenon when external light is incident into the first conductive pattern MTL1 when it does not include any inclined surface.

Referring to FIG. 10, the first conductive pattern MTL1' may include a first metal layer 1010 and a second metal layer 1020. The first metal layer 1010 of the first conductive pattern MTL1' may include eleventh and twelfth sub-metal layers 1010a and 1010b.

Widths of the twelfth sub-metal layer 1010b in the first direction DR1 and the second direction DR2 may be smaller than widths of the second metal layer 1020 in the first direction DR1 and the second direction DR2, respectively. A width of the second metal layer 1020 may be defined as an average value of a width of a top surface of the second metal layer 1020 and a width of a bottom surface of the second metal layer 1020.

External light LT may be incident in the third direction DR3 toward the first conductive pattern MTL1'. The external light LT may be directly bumped (or shined) against the inclined surface SW' of the second metal layer 1020. The inclined surface SW' of the second metal layer 1020 of the first conductive pattern MTL1' may transfer (e.g., reflect) external light LT to an unintended place (e.g., an unintended direction) by causing reflection of the external light LT. Accordingly, the visibility in the display device may be deteriorated. As the area of the inclined surface SW' which is not covered (or blocked) by the twelfth sub-metal layer 1010b is increased, the deterioration of the visibility of the display device due to the external light may become more serious (or more severe).

In contrast, referring to FIG. 11, the first conductive pattern MTL1 may include a first metal layer 1110 and a second metal layer 1120. The first metal layer 1110 of the first conductive pattern MTL1 may include eleventh to fourteenth sub-metal layers 1110a, 1110b, 1110c, and 1110d. The second metal layer 1120 of the first conductive pattern MTL1 may include twenty-first to twenty-third sub-metal layers 1120a, 1120b, and 1120c.

Widths of the twelfth sub-metal layer 1110b in the first direction DR1 and the second direction DR2 may be greater than widths of the twenty-first sub-metal layer 1120a in the first direction DR1 and the second direction DR2, respectively. Widths of the thirteenth sub-metal layer 1110c in the first direction DR1 and the second direction DR2 may be greater than widths of the twenty-second sub-metal layer 1120b in the first direction DR1 and the second direction DR2, respectively. Widths of the fourteenth sub-metal layer 1110d in the first direction DR1 and the second direction DR2 may be greater than widths of the twenty-third sub-metal layer 1120c in the first direction DR1 and the second direction DR2, respectively.

External light may be incident in the third direction DR3 toward the first conductive pattern MTL1. In the first conductive pattern MTL1, the external light LT may be incident into the eleventh to fourteenth sub-metal layers 1110a, 1110b, 1110c, and 1110d as metal layers having a relatively low reflectivity. Accordingly, direct bump (or reflection) of the external light LT against the twenty-first to twenty-third sub-metal layers 1120a, 1120b, and 1120c as metal layers having a relatively high reflectivity can be reduced (or prevented). Thus, the visibility of the display device can be improved.

Figure 12:
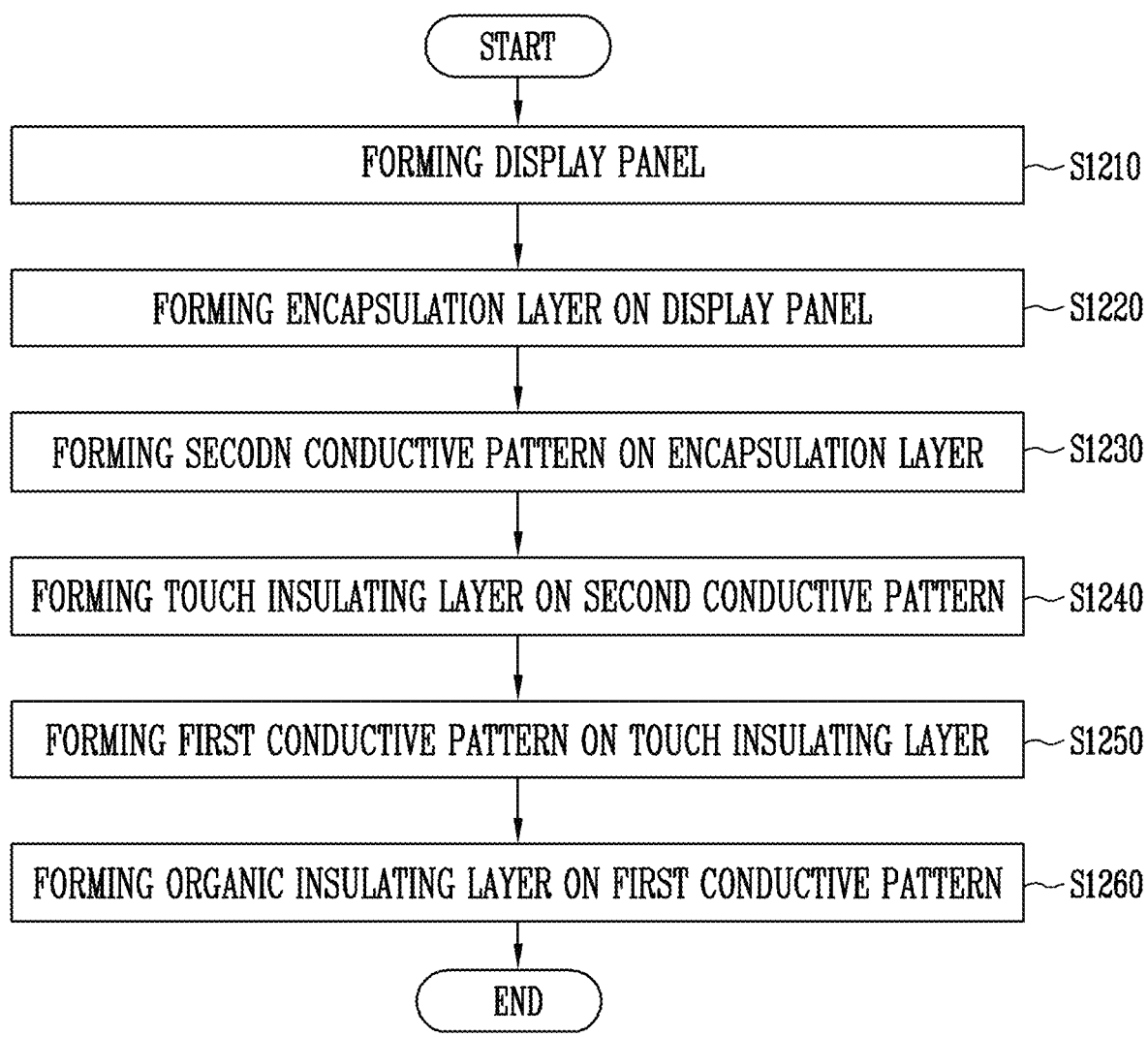
FIG. 12 is a flowchart illustrating a method of manufacturing the display device, in accordance with some embodiments of the present disclosure.

FIG. 12 is a flowchart illustrating a method of manufacturing the display device in accordance with embodiments of the present disclosure.

Referring to FIG. 12, the method of manufacturing the display device may include step S1210 of forming a display panel, step S1220 of forming an encapsulation layer on the display panel, step S1230 of forming a second conductive pattern on the encapsulation layer, step S1240 of forming a touch insulating layer on the second conductive pattern, step S1250 of forming a first conductive pattern on the touch insulating layer, step S1260 of forming an organic insulating layer on the first conductive pattern, and/or the like.

Hereinafter, the method of manufacturing the display device will be described in more detail with reference to FIGS. 13 to 20.

FIGS. 13 to 20 are views illustrating an example of the method shown in FIG. 12.

Figure 13:
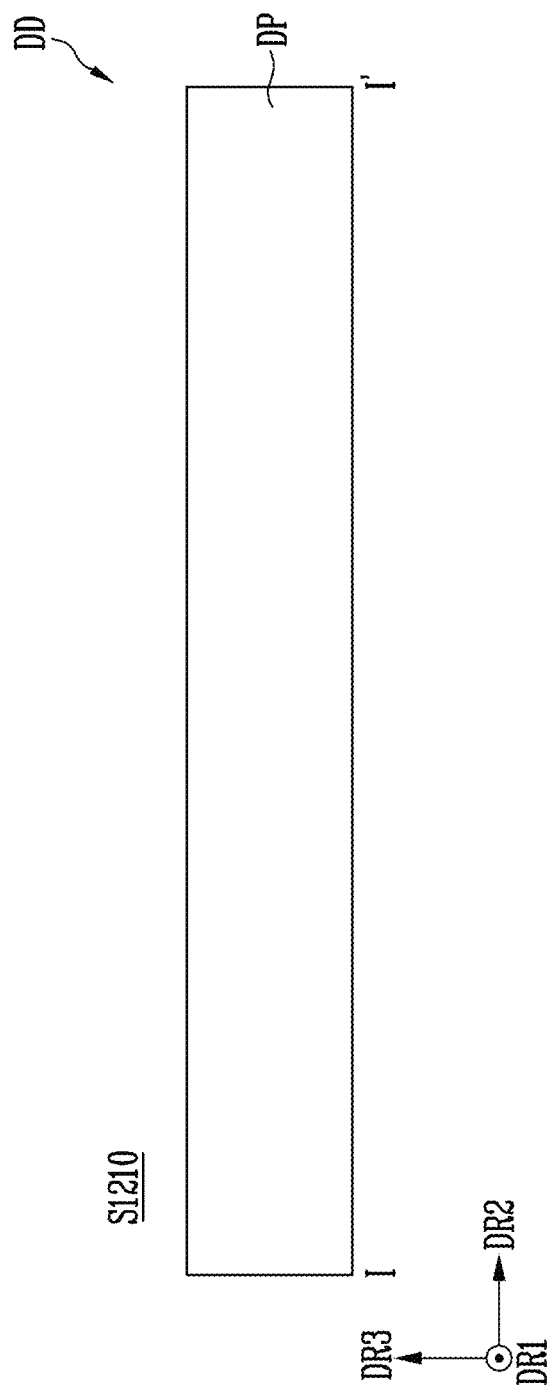
FIGS. 13 to 20 are views illustrating an example embodiment of the method shown in FIG. 12, in accordance with some embodiments of the present disclosure.

Referring to FIG. 13, a display panel DP may be formed. The display panel DP may include a substrate, a circuit element layer in which circuit elements are formed, a light emitting element layer, and/or the like.

Figure 14:
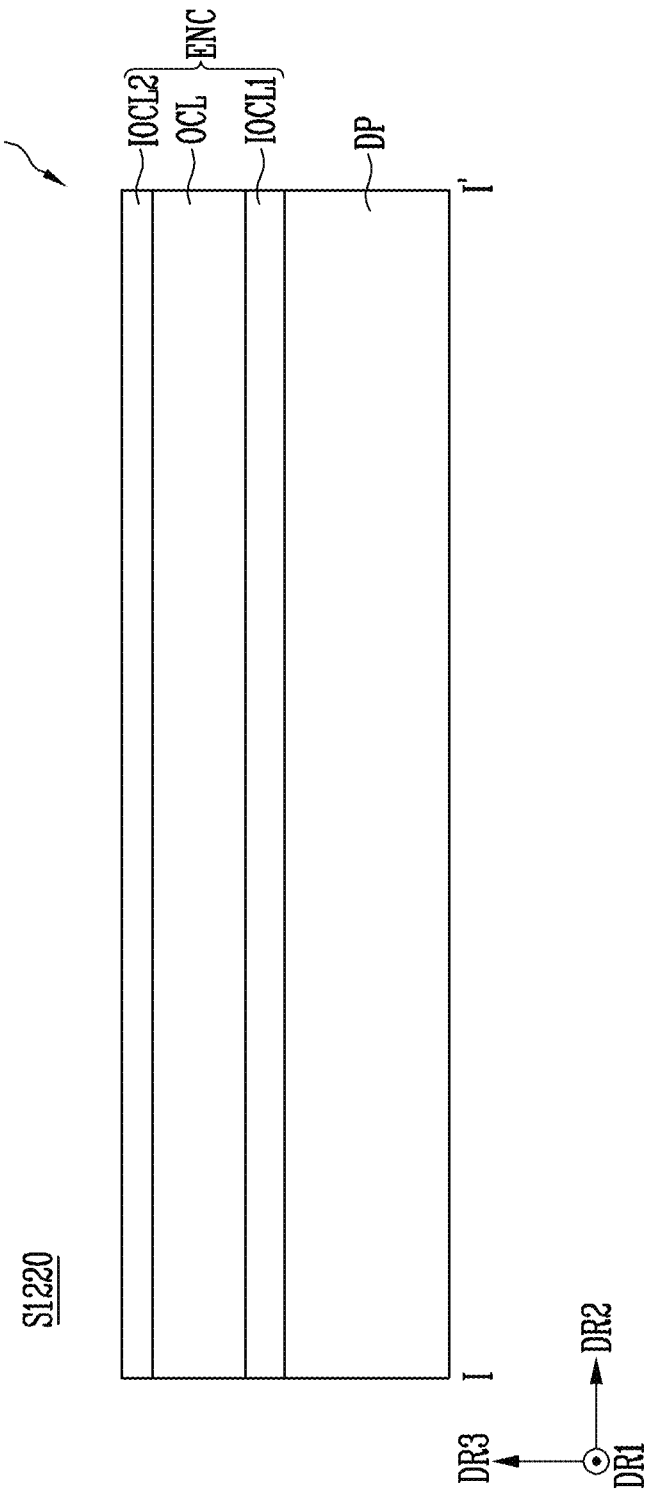

Referring to FIG. 14, a first inorganic encapsulation layer IOCL1 may be formed on the display panel DP. After that, an organic encapsulation layer OCL may be formed on the first inorganic encapsulation layer IOCL1. After that, a second inorganic encapsulation layer IOCL2 may be formed on the organic encapsulation layer OCL.

Figure 15:
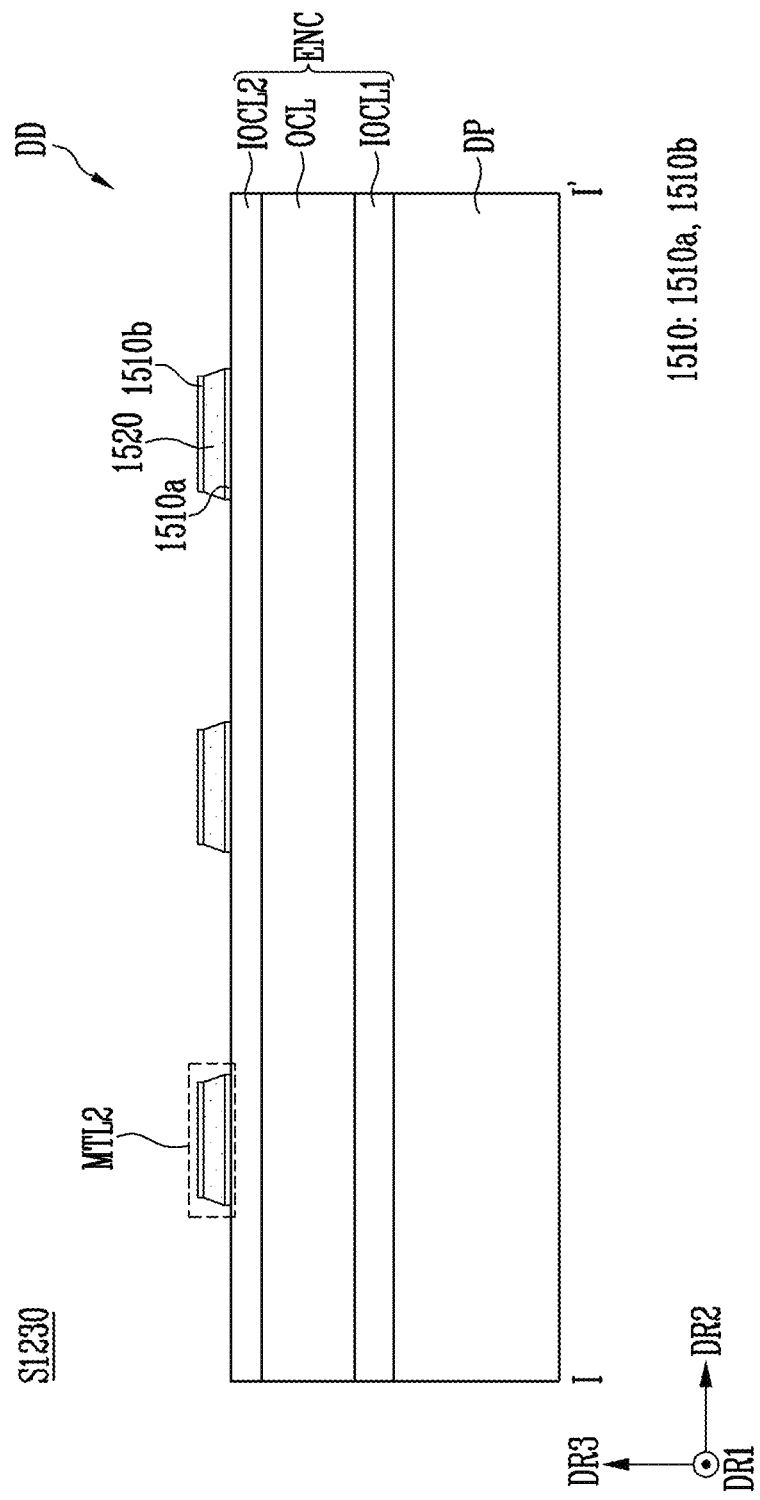

Referring to FIG. 15, second conductive patterns MTL2 may be formed on the second inorganic encapsulation layer IOCL2. In FIG. 15, it is illustrated that each of the second conductive patterns MTL2 has the shape shown in FIG. 7, which includes an inclined surface. However, the present disclosure is not limited thereto. For example, each of the second conductive patterns MTL2 may have the shape shown in FIG. 8, which does not include any inclined surfaces. Hereinafter, it is described that each of the second conductive patterns MTL2 has the shape shown in FIG. 7, which includes the inclined surface.

Each of the second conductive patterns MTL2 may be formed by alternately stacking layers including different metals and then performing an etching process on the stacked layers. For example, a first metal layer 1510 and a second metal layer 1520 may be formed by sequentially stacking a titanium layer, an aluminum layer, and a titanium layer on the second inorganic encapsulation layer IOCL2 and then performing an etching process on the stacked layers. An etchant capable of etching both the first metal layer 1510 and the second metal layer 1520 may be utilized as an etchant in the etching process. For example, in embodiments in which the first metal layer 1510 includes titanium, the etchant may include fluorine F (e.g., hydrofluoric acid (HF) or ammonium fluoride ($NH_4F$)) and/or the like. For example, in embodiments in which the second metal layer 1520 includes aluminum, the etchant may include at least one of oxalic acid ($H_2C_2O_4$)-based materials and hydrochloric acid (HCl)-based materials.

In the etching process, because the layer located at an upper portion (e.g., in the third direction DR3) of the display panel DP has a wider contact surface with the etchant, a larger amount of a metal material constituting each metal layer may be removed. In the above embodiments, the second conductive pattern MTL2 may have a trapezoidal shape. However, embodiments of the present disclosure are not limited thereto.

Figure 16:
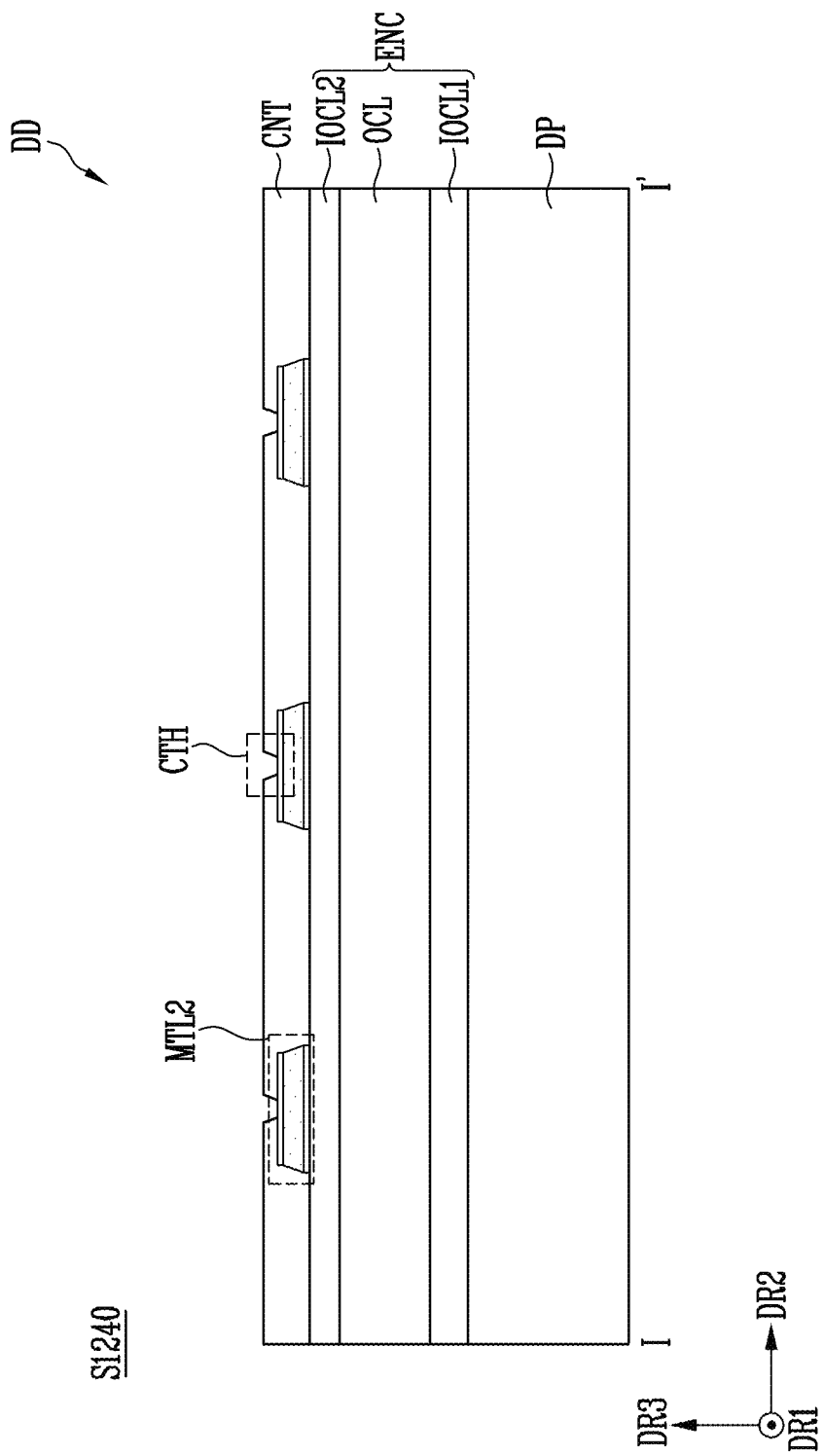

Referring to FIG. 16, a touch insulating layer CNT may be formed on the second inorganic encapsulation layer IOCL2. For example, an insulating material may be deposited on the second inorganic encapsulation layer IOCL2 on which the second conductive pattern MTL2 is formed, thereby forming the touch insulating layer CNT.

The touch insulating layer CNT may include a contact hole CTH. Referring to FIG. 16, the touch insulating layer CNT may be removed in at least a partial area on the second conductive pattern MTL2, and the contact hole CTH may be formed in the area in which the touch insulating layer CNT is removed.

Figure 17:
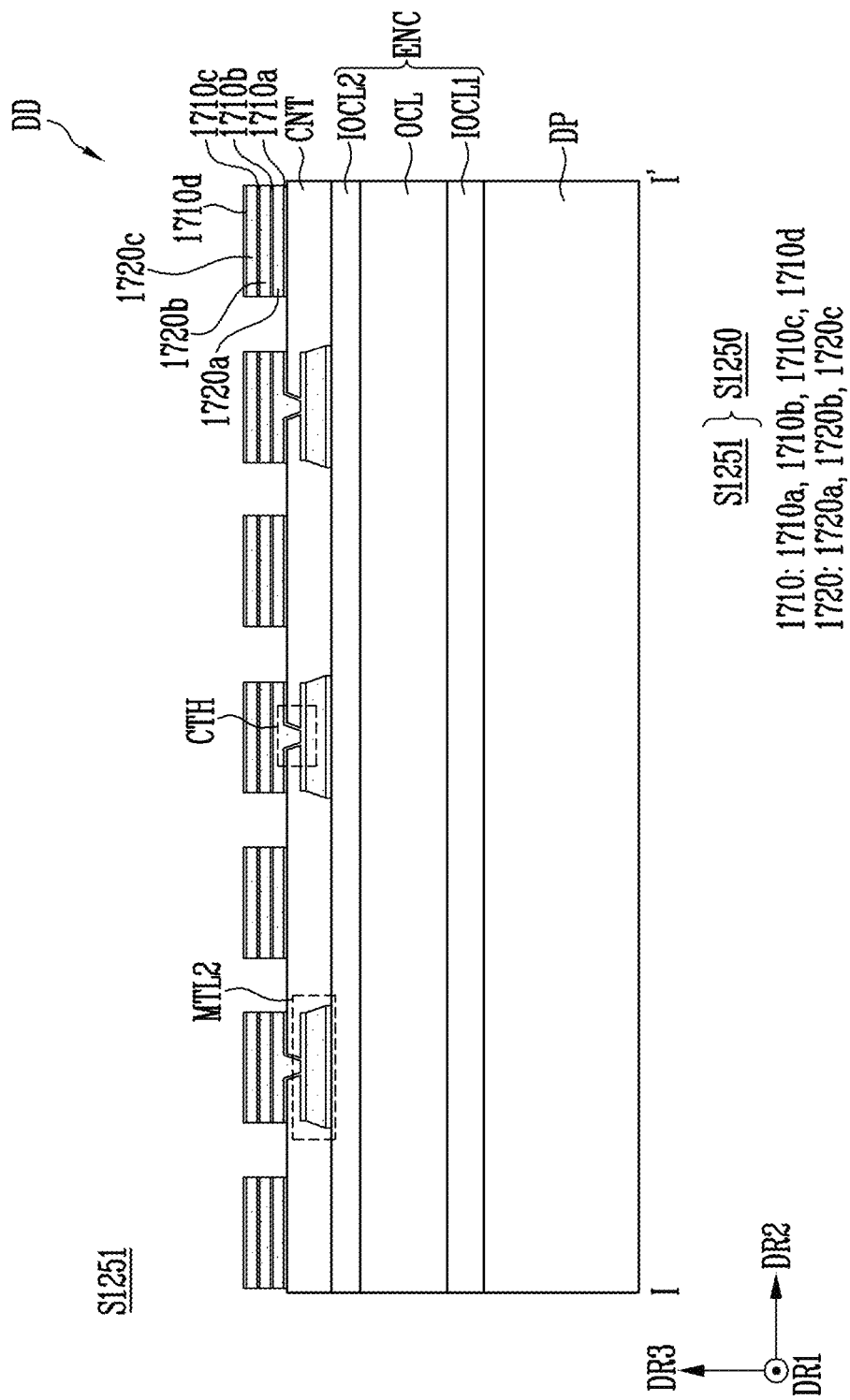
Figure 18:
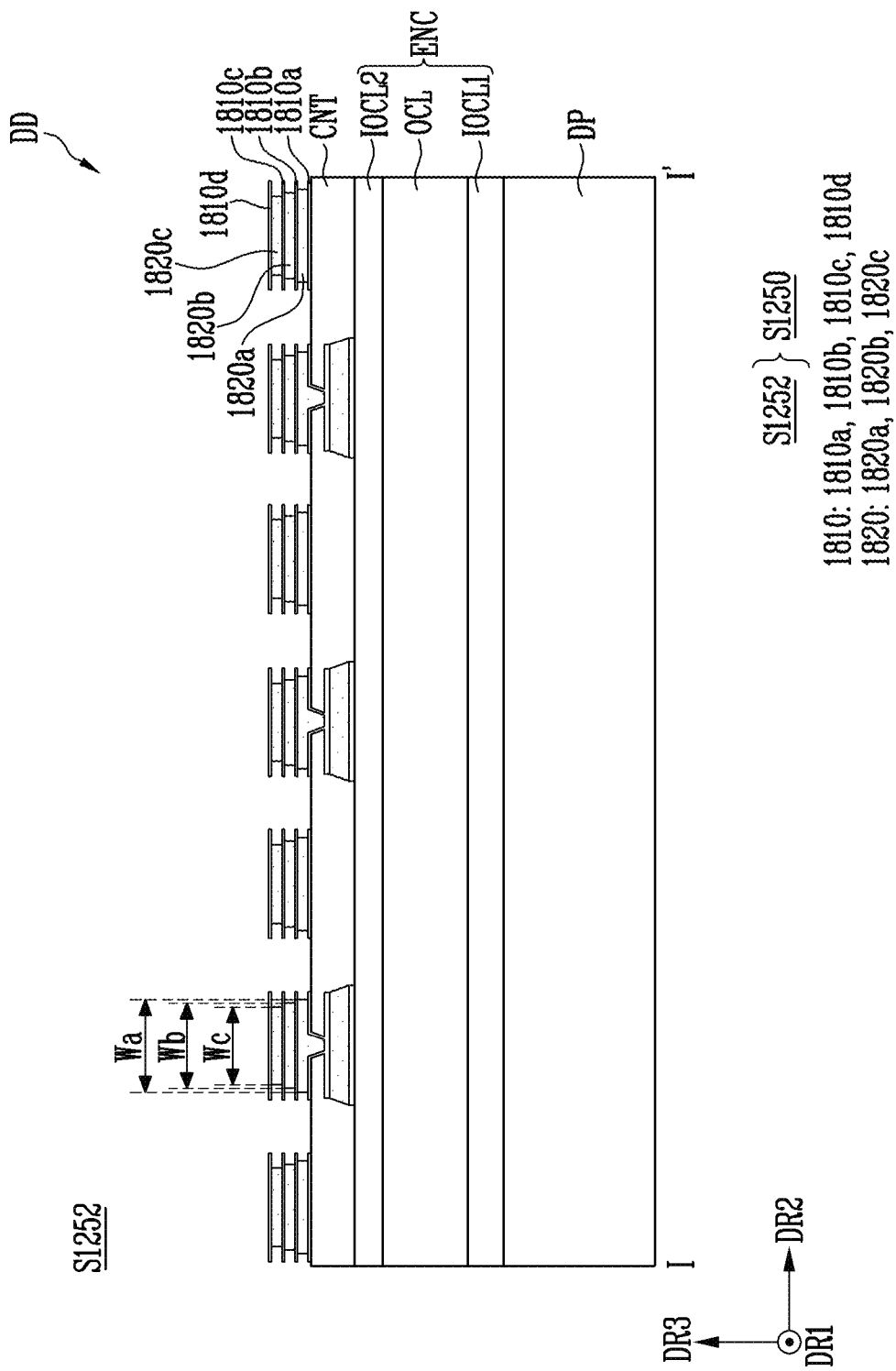
Figure 19:
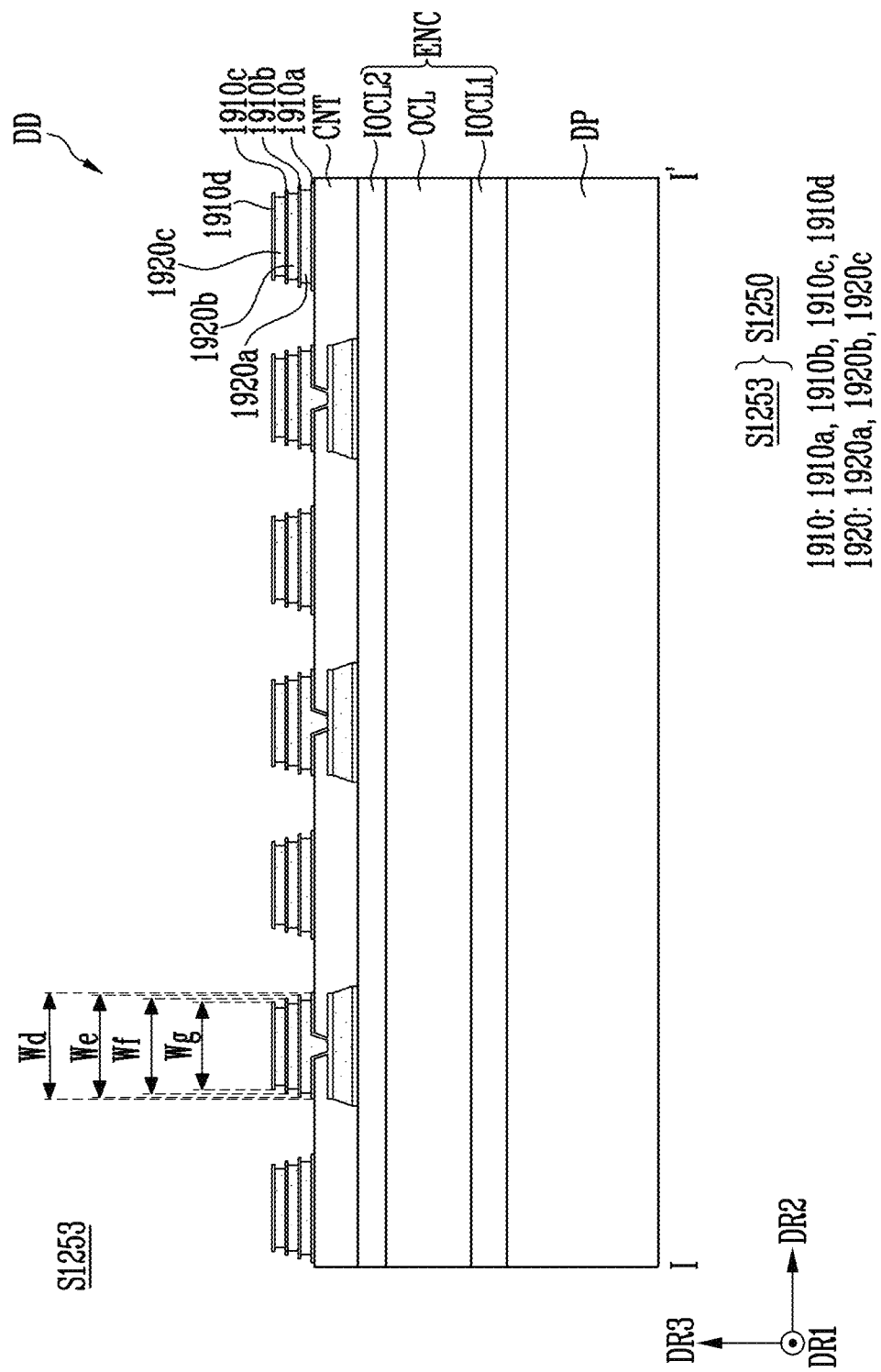

FIGS. 17 to 19 are views illustrating the steps of forming the first conductive pattern. FIG. 17 is a view illustrating step S1251 of depositing a first metal layer 1710 and a second metal layer 1720 on the touch insulating layer CNT.

Referring to FIG. 17, the first metal layer 1710 may include eleventh to fourteenth sub-metal layers 1710a to 1710d. The second metal layer 1720 may include twenty-first to twenty-third sub-metal layers 1720a to 1720c. The first metal layer 1710 may include at least one of Carbon Nano Tube (CNT) or titanium (Ti). The second metal layer 1720 may include at least one of copper (Cu) or aluminum (Al).

First, the step of depositing the first metal layer and the second metal layer on the touch insulating layer CNT may include a step of depositing the eleventh sub-metal layers 1710a on the second conductive pattern MTL2 and the touch insulating layer CNT.

Next, the step of depositing the first metal layer and the second metal layer on the touch insulating layer CNT may include a step of removing at least a portion of each of the eleventh sub-metal layers 1710a.

At least a portion of each of eleventh sub-metal layers 1710a that are in direct contact with the second conductive pattern MTL2 from among the deposited eleventh sub-metal layers 1710a may be removed. For example, at least a portion of each of the eleventh sub-metal layers 1710a in direct contact with the second conductive pattern MTL2 in the area in which the contact hole CTH is located may be removed.

Finally, the step of depositing the first metal layer and the second metal layer on the touch insulating layer CNT may include a step of alternately stacking the twelfth to fourteenth sub-metal layers 1710b to 1710d and the twenty-first to twenty-third sub-metal layers 1720a to 1720c.

The twenty-first sub-metal layers 1720a may be stacked on the eleventh sub-metal layers 1710a. The twelfth sub-metal layers 1710b may be stacked to the twenty-first sub-metal layers 1720a. The twenty-second sub-metal layers 1720b may be stacked on the twelfth sub-metal layers 1710b. The thirteenth sub-metal layers 1710c may be stacked on the twenty-second sub-metal layers 1720b. The twenty-third sub-metal layers 1720c may be stacked on the thirteenth sub-metal layers 1710c. The fourteenth sub-metal layers 1710d may be stacked on the twenty-third sub-metal layers 1720c.

FIG. 18 is a view illustrating step S1252 of etching a second metal layer 1820.

Referring to FIG. 18, in an etching process of the second metal layer 1820, an etchant capable of etching only the second metal layer 1820 may be utilized. For example, in embodiments in which the second metal layer 1820 includes aluminum, the etchant may include at least one of oxalic acid ($H_2C_2O_4$)-based materials and hydrochloric acid (HCl)-based materials.

When the etching process of the second metal layer 1820 is performed, as a sub-metal layer from among twenty-first to twenty-third sub-metal layers 1820a, 1820b, and 1820c is located closer to the touch insulating layer CNT, widths of the sub-metal layer in the first direction DR1 and the second direction DR2 may become wider. For example, in FIG. 18, the twenty-first sub-metal layer 1820a, the twenty-second sub-metal layer 1820b, and the twenty-third sub-metal layer 1820c may sequentially have an ath width Wa, a bth width Wb, and a cth width Wc in the second direction DR2 from the twenty-first sub-metal layer 1820a closest to the touch insulating layer CNT. The ath width Wa, the bth width Wb, and the cth width Wc may be sequentially decreasing.

FIG. 19 is a view illustrating step S1253 of etching a first metal layer 1910.

Referring to FIG. 19, in an etching process of the first metal layer 1910, an etchant capable of etching only the first metal layer 1910 may be utilized. For example, in embodiments in which the first metal layer 1910 includes aluminum, the etchant may include at least one of hydrofluoric acid (HF) or ammonium fluoride ($NH_4F$).

When the etching process of the first metal layer 1910 is performed, as a sub-metal layer among eleventh to fourteenth sub-metal layers 1910a, 1910b, 1910c, and 1910d is located closer to the touch insulating layer CNT, widths of the sub-metal layer in the first direction DR1 and the second direction DR2 may become wider. For example, in FIG. 19, the eleventh sub-metal layer 1910a, the twelfth sub-metal layer 1910b, the thirteenth sub-metal layer 1910c, and the fourteenth sub-metal layer 1910d may sequentially have a dth width Wd, an eth width We, an fth width Wf, and a gth width Wg in the second direction DR2 from the eleventh sub-metal layer 1910a closest to the touch insulating layer CNT. The dth width Wd, the eth width We, the fth width Wf, and the gth width Wg may be sequentially decreasing.

Figure 20:
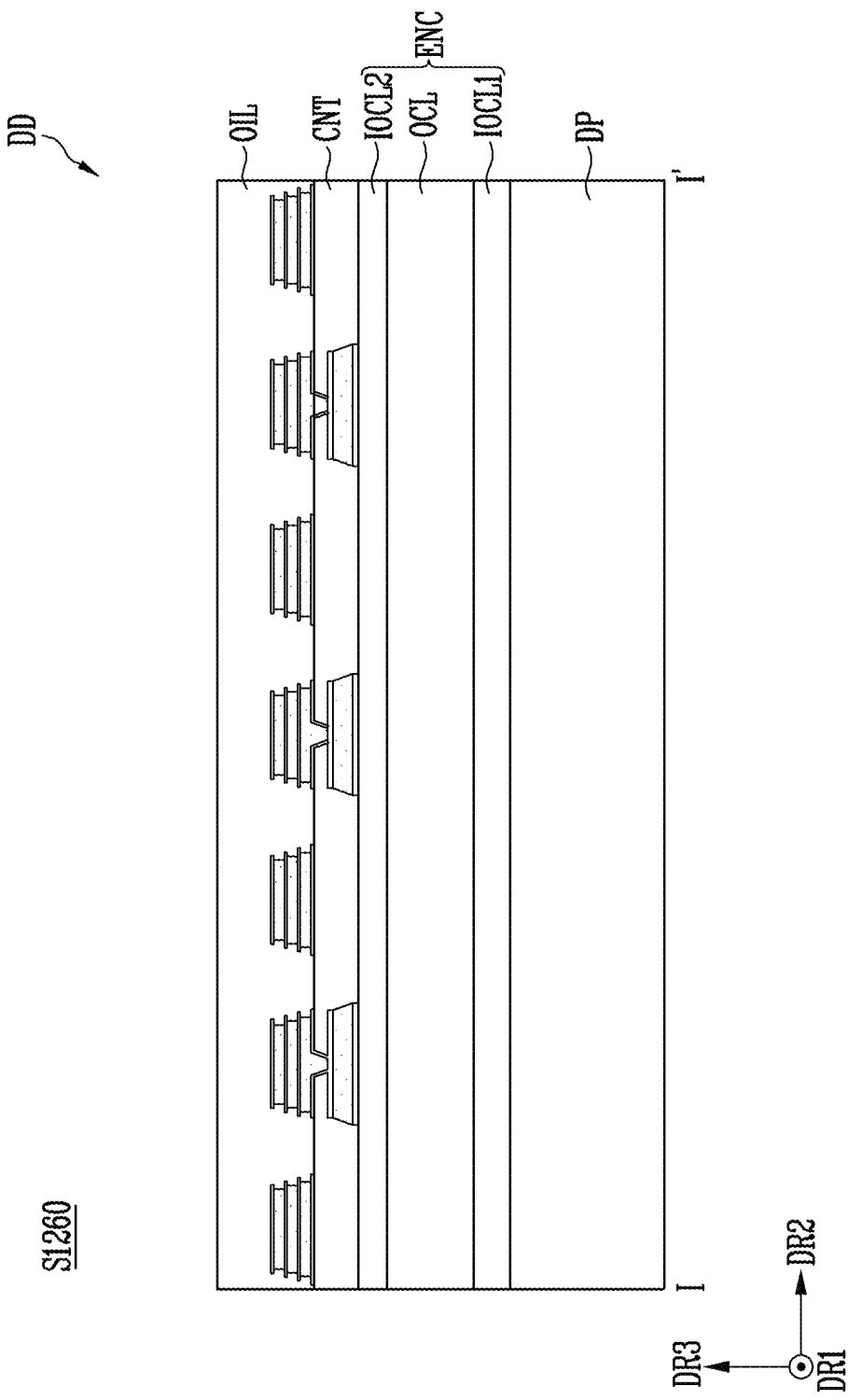

Referring to FIG. 20, an organic insulating layer OIL may be formed on the touch insulating layer CNT in accordance with some embodiments.

The display device in accordance with the embodiments of the present disclosure include the first conductive pattern MTL1 having a structure capable of reducing reflection of light (or external light) incident from the outside, so that visibility can be improved.

In accordance with embodiments of the present disclosure, there can be provided a touch sensor, a display device including the same, and a method of manufacturing the same, in which side external light reflection can be reduced.

Example embodiments have been disclosed herein, and although specific terms are employed, they are used and are to be interpreted in a generic and descriptive sense only and not for purpose of limitation. In some instances, as would be apparent to one of ordinary skill in the art at the time of filing of the present application, features, characteristics, and/or elements described in connection with particular embodiments may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims and equivalents thereof.

What is claimed is:

1. A display device comprising:
   a display panel comprising a plurality of pixels;
   a first conductive pattern on the display panel;
   a touch insulating layer covering at least a portion of the first conductive pattern; and
   a second conductive pattern on the touch insulating layer, the second conductive pattern connected to the first conductive pattern through a contact hole in which at least a portion of the touch insulating layer is removed,
   wherein the second conductive pattern comprises a first metal layer and a second metal layer,
   wherein the first metal layer comprises a plurality of sub-metal layers, the plurality of sub-metal layers of the first metal layer comprising a first sub-metal layer,
   wherein the second metal layer comprises a plurality of sub-metal layers, the plurality of sub-metal layers of the second metal layer comprising a first sub-metal layer,
   wherein the second conductive pattern comprises a multilayer structure in which the plurality of sub-metal layers of the first metal layer and the plurality of sub-metal layers of the second metal layer are alternately arranged,
   wherein the first sub-metal layer of the first metal layer is stacked on the first sub-metal layer of the second metal layer, and
   wherein a width of the first sub-metal layer of the first metal layer is wider than a width of the first sub-metal layer of the second metal layer.

2. The display device of claim 1, wherein a width of the first sub-metal layer of the first metal layer in a first direction and a width of the first sub-metal layer of the first metal layer in a second direction crossing the first direction are wider than a width of the first sub-metal layer of the second metal layer in the first direction and a width of the first sub-metal layer of the second metal layer in the second direction, respectively.

3. The display device of claim 1, wherein the first metal layer comprises at least one of carbon nano tube or titanium, and
   wherein the second metal layer comprises at least one of aluminum or copper.

4. The display device of claim 1, wherein a reflectivity of the first metal layer is lower than a reflectivity of the second metal layer.

5. The display device of claim 1, wherein, a width of each of the plurality of sub-metal layers of the first metal layer that is closer to the touch insulating layer is wider than a width of a sub-metal layer of the plurality of sub-metal layers that is farther from the touch insulating layer, and
   wherein, a width of each of the plurality of sub-metal layers of the second metal layer that are closer to the touch insulating layer is wider than a width of the sub-metal layer that is farther from the touch insulating layer.

6. The display device of claim 1, wherein the first conductive pattern comprises a third metal layer and a fourth metal layer,
   wherein the third metal layer comprises a first sub-metal layer and a second sub-metal layer,
   wherein the fourth metal layer is between the first sub-metal layer and the second sub-metal layer of the third metal layer, and
   wherein the fourth metal layer comprises a trapezoidal shape in which an area of a lower side is greater than an area of an upper side, and comprises an inclined sidewall connecting the lower side with the upper side.

7. The display device of claim 1, wherein the first conductive pattern comprises a third metal layer and a fourth metal layer,
   wherein the third metal layer comprises a plurality of sub-metal layers, the plurality of sub-metal layers of the third metal layer comprising a first sub-metal layer,
   wherein the fourth metal layer comprises a plurality of sub-metal layers, the plurality of sub-metal layers of the fourth metal layer comprising a first sub-metal layer,
   wherein the first conductive pattern comprises a multilayer structure in which the plurality of sub-metal layers of the third metal layer and the plurality of sub-metal layers of the fourth metal layer are alternately arranged,
   wherein the first sub-metal layer of the third metal layer are stacked on the first sub-metal layer of the fourth metal layer, and
   wherein a width of the first sub-metal layer of the third metal layer is wider than a width of the first sub-metal layer of the fourth metal layer.

8. A method of manufacturing a display device, the method comprising:

forming an encapsulation layer on a display panel;
forming a first conductive pattern on the encapsulation layer;
forming a touch insulating layer covering at least a portion of the first conductive pattern; and
forming a second conductive pattern on the touch insulating layer,
wherein the second conductive pattern comprises a first metal layer and a second metal layer,
wherein the first metal layer comprises a plurality of sub-metal layers, the plurality of sub-metal layers of the first metal layer comprising a first sub-metal layer,
wherein the second metal layer comprises a plurality of sub-metal layers, the plurality of sub-metal layers of the second metal layer comprising a first sub-metal layer,
wherein the second conductive pattern comprises a multi-layer structure in which the plurality of sub-metal layers of the first metal layer and the plurality of sub-metal layers of the second metal layer are alternately arranged,
wherein the first sub-metal layer of the first metal layer is stacked on the first sub-metal layer of the second metal layer, and
wherein a width of the first sub-metal layer of the first metal layer is wider than a width of the first sub-metal layer of the second metal layer.

9. The method of claim 8, wherein the forming of the second conductive pattern on the touch insulating layer comprises:
depositing a first metal material for the first metal layer;
depositing a second metal material for the second metal layer;
etching the first metal layer with a first etchant; and
etching the second metal layer with a second etchant,
wherein the first etchant is different from the second etchant.

10. The method of claim 9, wherein the first etchant comprises at least one of hydrofluoric acid or ammonium fluoride, and
wherein the second etchant comprises at least one of oxalic acid-based materials or hydrochloric acid-based materials.

11. The method of claim 8, wherein a width of the first sub-metal layer of the first metal layer in a first direction and a width of the first sub-metal layer of the first metal layer in a second direction crossing the first direction are wider than a width of the first sub-metal layer of the second metal layer in the first direction and a width of the first sub-metal layer of the second metal layer in the second direction, respectively.

12. The method of claim 8, wherein the first metal layer comprises at least one of carbon nano tube or titanium, and
wherein the second metal layer comprises at least one of aluminum or copper.

13. The method of claim 8, wherein a reflectivity of the first metal layer is lower than a reflectivity of the second metal layer.

14. The method of claim 8, wherein, a width of each of the plurality of sub-metal layers of the first metal layer that is closer to the touch insulating layer is wider than a width of a sub-metal layer of the plurality of sub-metal layers that is farther from the touch insulating layer, and
wherein, a width of each of the plurality of sub-metal layers of the second metal layer that are closer to the touch insulating layer is wider than a width of the sub-metal layer that is farther from the touch insulating layer.

15. The method of claim 8, wherein the first conductive pattern comprises a third metal layer and a fourth metal layer,
wherein the third metal layer comprises a plurality of sub-metal layers, the plurality of sub-metal layers of the third metal layer comprising a first sub-metal layer,
wherein the fourth metal layer comprises a plurality of sub-metal layers, the plurality of sub-metal layers of the first metal layer comprising a first sub-metal layer,
wherein the first conductive pattern comprises a multi-layer structure in which the plurality of sub-metal layers of the third metal layer and the plurality of sub-metal layers of the fourth metal layer are alternately arranged,
wherein the first sub-metal layer of the third metal layer is stacked on the first sub-metal layer of the fourth metal layer, and
wherein a width of the first sub-metal layer of the third metal layer is wider than a width of the first sub-metal layer of the fourth metal layer.

16. The method of claim 8, wherein the first conductive pattern comprises a third metal layer and a fourth metal layer,
wherein the third metal layer comprises a first sub-metal layer and a second sub-metal layer,
wherein the fourth metal layer is between the first sub-metal layer and the second sub-metal layer of the third metal layer, and
wherein the fourth metal layer has a trapezoidal shape in which an area of a lower side is greater than an area of an upper side, and comprises an inclined sidewall connecting the lower side with the upper side.

17. A touch sensor comprising:
a sensing electrode extending in a first direction; and
a driving electrode extending in a second direction crossing the first direction,
wherein at least one of the sensing electrode or the driving electrode comprises:
a first conductive pattern;
a touch insulating layer covering at least a portion of the first conductive pattern; and
a second conductive pattern on the touch insulating layer, the second conductive pattern connected to the first conductive pattern in a contact hole in which at least a portion of the touch insulating layer is removed,
wherein the second conductive pattern comprises a first metal layer and a second metal layer,
wherein the first metal layer comprises a plurality of sub-metal layers, the plurality of sub-metal layers of the first metal layer comprising a first sub-metal layer,
wherein the second metal layer comprises a plurality of sub-metal layers, the plurality of sub-metal layers of the second metal layer comprising a first sub-metal layer,
wherein the second conductive pattern comprises a multi-layer structure in which the plurality of sub-metal layers of the first metal layer and the plurality of sub-metal layers of the second metal layer are alternately arranged, and
wherein the first sub-metal layer of the first metal layer is stacked on the first sub-metal layer of the second metal layer, and a width of the first sub-metal layer of the first metal layer is wider than a width of the first sub-metal layer of the second metal layer.

18. The touch sensor of claim 17, wherein a width of the first sub-metal layer of the first metal layer in the first direction and a width of the first sub-metal layer of the first metal layer in the second direction are wider than a width of the first sub-metal layer of the second metal layer in the first direction and a width of the first sub-metal layer of the second metal layer in the second direction, respectively.

19. The touch sensor of claim 17, wherein the first metal layer comprises at least one of carbon nano tube or titanium, and wherein the second metal layer comprises at least one of aluminum or copper.

20. The touch sensor of claim 17, wherein the first conductive pattern comprises a third metal layer and a fourth metal layer, wherein the third metal layer comprises a plurality of sub-metal layers, the plurality of sub-metal layers of the third metal layer comprising a first sub-metal layer, wherein the fourth metal layer comprises a plurality of sub-metal layers, the plurality of sub-metal layers of the fourth metal layer comprising a first sub-metal layer, wherein the first conductive pattern has a multi-layer structure in which the plurality of sub-metal layers of the third metal layer and the plurality of sub-metal layers of the fourth metal layer are alternately arranged, and wherein the first sub-metal layer of the third metal layer is stacked on the first sub-metal layer of the fourth metal layer, and a width of the first sub-metal layer of the third metal layer is wider than a width of the first sub-metal layer of the fourth metal layer.

* * * * *